United States Patent
Kosugi et al.

(10) Patent No.: US 10,170,909 B2
(45) Date of Patent: Jan. 1, 2019

(54) CONVERTER AND PHOTOVOLTAIC GENERATION SYSTEMS WITH CONVERTER

(71) Applicant: TAIYO YUDEN CO., LTD., Tokyo (JP)

(72) Inventors: Akifumi Kosugi, Tokyo (JP); Yoji Imai, Tokyo (JP)

(73) Assignee: TAIYO YUDEN CO., LTD., Tokyo (JP)

( * ) Notice: Subject to any disclaimer, the term of this patent is extended or adjusted under 35 U.S.C. 154(b) by 753 days.

(21) Appl. No.: 14/630,446

(22) Filed: Feb. 24, 2015

(65) Prior Publication Data

US 2015/0244169 A1    Aug. 27, 2015

(30) Foreign Application Priority Data

Feb. 25, 2014   (JP) .................... 2014-033631

(51) Int. Cl.
| | |
|---|---|
| H02J 1/00 | (2006.01) |
| H02J 3/00 | (2006.01) |
| H02J 1/12 | (2006.01) |
| H02J 7/35 | (2006.01) |
| H02M 3/158 | (2006.01) |
| H02J 3/38 | (2006.01) |

(52) U.S. Cl.
CPC ............... *H02J 1/12* (2013.01); *H02J 3/385* (2013.01); *H02J 7/35* (2013.01); *H02M 3/158* (2013.01); *H02M 3/1582* (2013.01); *Y02E 10/566* (2013.01); *Y02E 10/58* (2013.01); *Y10T 307/691* (2015.04)

(58) Field of Classification Search
CPC .... H02J 1/12; H02J 3/385; H02J 7/35; H02M 3/158; H02M 3/1582; Y02E 10/566; Y02E 10/58; Y10T 307/691
USPC ....................................................... 307/78
See application file for complete search history.

(56) References Cited

U.S. PATENT DOCUMENTS

| | | | |
|---|---|---|---|
| 2003/0105891 A1* | 6/2003 | Moriyama | G05B 19/0423 710/2 |
| 2008/0143188 A1 | 6/2008 | Adest et al. | |
| 2008/0150366 A1 | 6/2008 | Adest et al. | |
| 2008/0164766 A1 | 7/2008 | Adest et al. | |
| 2009/0284240 A1* | 11/2009 | Zhang | G05F 1/67 323/285 |

(Continued)

FOREIGN PATENT DOCUMENTS

| | | |
|---|---|---|
| JP | 2010-521720 A | 6/2010 |
| JP | 2012-004626 A | 1/2012 |

*Primary Examiner* — Rexford Barnie
*Assistant Examiner* — Toan Vu
(74) *Attorney, Agent, or Firm* — Chen Yoshimura LLP

(57) ABSTRACT

A converter for use in a distributed power system for stepping up or down a voltage of a power source connected thereto includes a step up/down circuit that receives the voltage, steps up or steps down the voltage from the power source, and then outputs the stepped up/down voltage; and a control circuit that detects the voltage from the power source and transmits a control signal for stepping up or stepping down the voltage to the step up/down circuit. The control circuit transmits an identification signal that identifies the converter and is configured to receive an identification signal from another converter when the other converter is connected to the converter.

7 Claims, 24 Drawing Sheets

(56) References Cited

U.S. PATENT DOCUMENTS

| | | | |
|---|---|---|---|
| 2010/0127570 A1* | 5/2010 | Hadar | H04B 3/548 |
| | | | 307/77 |
| 2012/0043923 A1* | 2/2012 | Ikriannikov | H02J 1/10 |
| | | | 320/103 |
| 2013/0089120 A1 | 4/2013 | Kasai et al. | |

* cited by examiner

| PVs in Series | Clamp Voltage | OVP Voltage |
|---|---|---|
| Two | 170V | 180V |
| Three | 150V | 160V |

FIG. 13

CONVERTER AND PHOTOVOLTAIC GENERATION SYSTEMS WITH CONVERTER

TECHNICAL FIELD

The present invention relates to a converter for a distributed power source such as a photovoltaic panel, a fuel cell, or the like.

BACKGROUND ART

With the spread of distributed power sources such as photovoltaic cells (PVs), fuel cells, and so on, various methods for obtaining optimal power from such power sources are being developed.

In the case where PVs are used as a distributed power source, there is a method that provides a DC/DC converter that carries out MPPT (Maximum Power Point Tracking) control in each PV in order to obtain a maximum amount of power from the PVs.

Japanese Translation of PCT International Application Publication No. 2010-521720, for example, discloses a DC/DC converter that carries out MPPT control being provided with a communication function, and information obtained from current and voltage sensors and the like is sent to a central analysis station, where the information is monitored, controlled, and analyzed.

Furthermore, Japanese Patent Application Laid-Open Publication No. 2012-004626, for example, discloses transmitters provided in each of a plurality of PVs transmitting power generation information to a communication parent device over a power line in order to monitor power generated by the PVs.

In this manner, the concept of providing a communication device in each PV has been explored, but such a configuration also means separately providing a host apparatus for the plurality of PVs, which increases the cost of the overall system by the amount of the host apparatus. Furthermore, although the host apparatus is described as carrying out control, the stated documents do not describe exactly how that control is carried out.

Meanwhile, there are cases where a plurality of strings, in each of which a plurality of PVs are connected in series, are connected in parallel, and are further connected to a PCS (Power Conditioning System) and used. A PCS converts a DC (Direct Current) output from the PVs into a household-use AC (Alternating Current) output, and output voltages of the respective strings connected in parallel are adjusted to the same value. Here, in the case where the number of PVs connected in series differs from string to string, the output voltage is adjusted for each PV in each string. Such adjustment is thus carried out not only when a photovoltaic power generating system is installed, but also in a case such as where a PV panel or panels have partially failed, and there are no systems that carry out the adjustment autonomously.

RELATED ART DOCUMENTS

Patent Documents

Patent Document 1: Japanese Translation of PCT International Application Publication No. 2010-521720
Patent Document 2: Japanese Patent Application Laid-Open Publication No. 2012-004626

SUMMARY OF THE INVENTION

Problems to be Solved by the Invention

Accordingly, it is an object of the present invention to provide a converter that steps up or steps down a voltage of a distributed power source capable of autonomously adjusting an output voltage based on a connection state of the distributed power source.

Means for Solving the Problems

According to a first aspect of the present invention, a converter for use in a distributed power system for stepping up or down a voltage of a power source connected thereto includes: a step up/down circuit that receives the voltage, steps up or steps down the voltage from the power source, and then outputs the stepped up/down voltage; and a control circuit that detects the voltage from the power source and transmits a control signal for stepping up or stepping down the voltage to the step up/down circuit, wherein the control circuit transmits an identification signal that identifies the converter and is configured to receive an identification signal from another converter when the another converter is connected to the converter.

Through this, the number of converters connected in series can be specified and an output voltage can be stepped up or stepped down autonomously using a simple configuration.

Meanwhile, the identification signal is a random number or a pre-set identifier. This makes it possible to eliminate the burden of an installer of the system assigning unique identifiers to each converter during the installation process.

Furthermore, according to another aspect of the present invention, a photovoltaic power generating system has one or more strings connected in parallel, each of the one or more strings having a plurality of converters that are connected in series at an output side and that are connected to a plurality of photovoltaic cells, respectively, at an input side, each converter stepping up or stepping down respective voltages generated by the plurality of photovoltaic cells respectively connected thereto, wherein each of the plurality of converters has a step up/down circuit that receives the voltage from the corresponding photovoltaic cell, steps up or steps down the voltage, and then outputs the stepped up/down voltage, and a control circuit that detects the voltage from the corresponding photovoltaic cell and transmits a control signal for stepping up or stepping down the voltage to the step up/down circuit, and wherein the control circuit generates an identifier that identifies the converter to which the control circuit belongs, and receives an identifier identifying other converters so as to detect the number of the plurality of converters connected in series in the corresponding string.

Through this, the photovoltaic power generating system can be installed easily.

Furthermore, the plurality of converters transmit and receive the identifiers with each other. This makes it possible to eliminate the burden of an installer of the system assigning unique identifiers to each converter during the installation process.

Additionally, the control circuit specifies the number of converters by repeatedly transmitting and receiving the identifiers and controls the step up/down circuit in accordance with the detected number of converters. Through this, the output voltage can be adjusted autonomously.

Moreover, the control circuit includes a memory that pre-stores prescribed voltages that are respectively set in accordance with the number of converters in the string, reads out one of the prescribed voltages that corresponds to the detected number of converters from the memory, and steps up or steps down the voltage from the corresponding photovoltaic cell so that the stepped up/down voltage coincides with the read-out prescribed voltage. This ensures that control based on the specified number of converters is carried out appropriately.

Furthermore, the control circuit performs control based on the voltage from the corresponding photovoltaic cell when the detected number of converters is less than a predetermined number, and carries out control so that an output voltage of the step up/down circuit is maintained close to a prescribed voltage when the detected number of converters coincides with the predetermined number and a predetermined condition indicating an output voltage of the step up/down circuit is stable is met. This enables efficient voltage output while holding the maximum power point voltage to the greatest extent possible. Additionally, the identifier is a random number or a pre-set value. The burden of an installer of the system assigning unique identifiers to each converter during the installation process can be eliminated.

A photovoltaic power system according to another aspect of the present invention has one or more strings connected in parallel, each of the one or more strings having a plurality of converters that are connected in series at an output side and that are connected to a plurality of photovoltaic cells, respectively, at an input side, each converter stepping up or stepping down respective voltages generated by the plurality of photovoltaic cells respectively connected thereto, wherein each converter in each of the strings steps up or steps down the voltage from the corresponding photovoltaic cell and outputs the stepped up/down voltage in accordance with the number of the converters connected in series in the corresponding string. Through this, the photovoltaic power generating system can be installed easily.

Effects of the Invention

According to several aspects of the present invention one aspect, an output voltage can be autonomously adjusted based on a connection state of a distributed power source.

BRIEF DESCRIPTION OF THE DRAWINGS

FIG. 13 is a diagram illustrating a clamp voltage and an OVP voltage set based on a connection number.

DETAILED DESCRIPTION OF EMBODIMENTS

Embodiment 1

Figure 1:
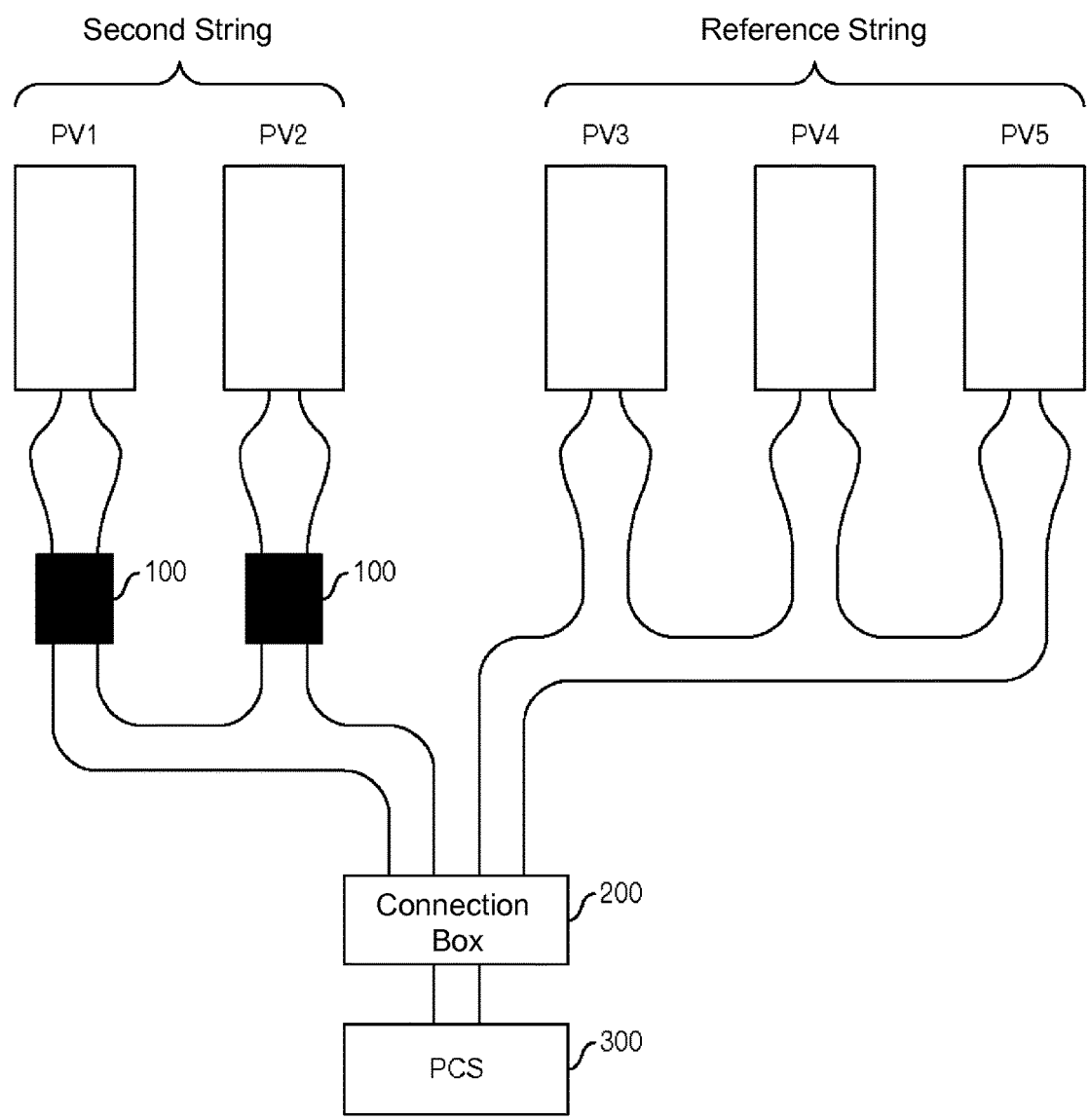
FIG. 1 is a diagram illustrating an overview of a photovoltaic power generating system according to Embodiment 1.

FIG. 1 illustrates an overview of a photovoltaic power generating system serving as an example of a distributed power source system according to the present embodiment.

In the present embodiment, a reference string in which three PVs 3 to 5 are connected in series and a second string in which two PVs 1 and 2 are connected in series are connected in parallel to a connection box 200. The connection box 200 is connected to a PCS 300.

Each of the two PVs 1 and 2 in the second string is connected to a microconverter 100 that executes primary operations according to the present embodiment. The microconverter 100 has a power line communication function, and communicates with other microconverters 100 connected in series. The microconverter 100 steps up and steps down an output voltage of a corresponding PV based on the output voltage and an output current of the PV and a number of PVs or microconverters 100 connected in series within the same string, as will be described later.

The PCS 300 according to the present embodiment does not differ from conventional technology and will therefore not be described further here.

Figure 2:
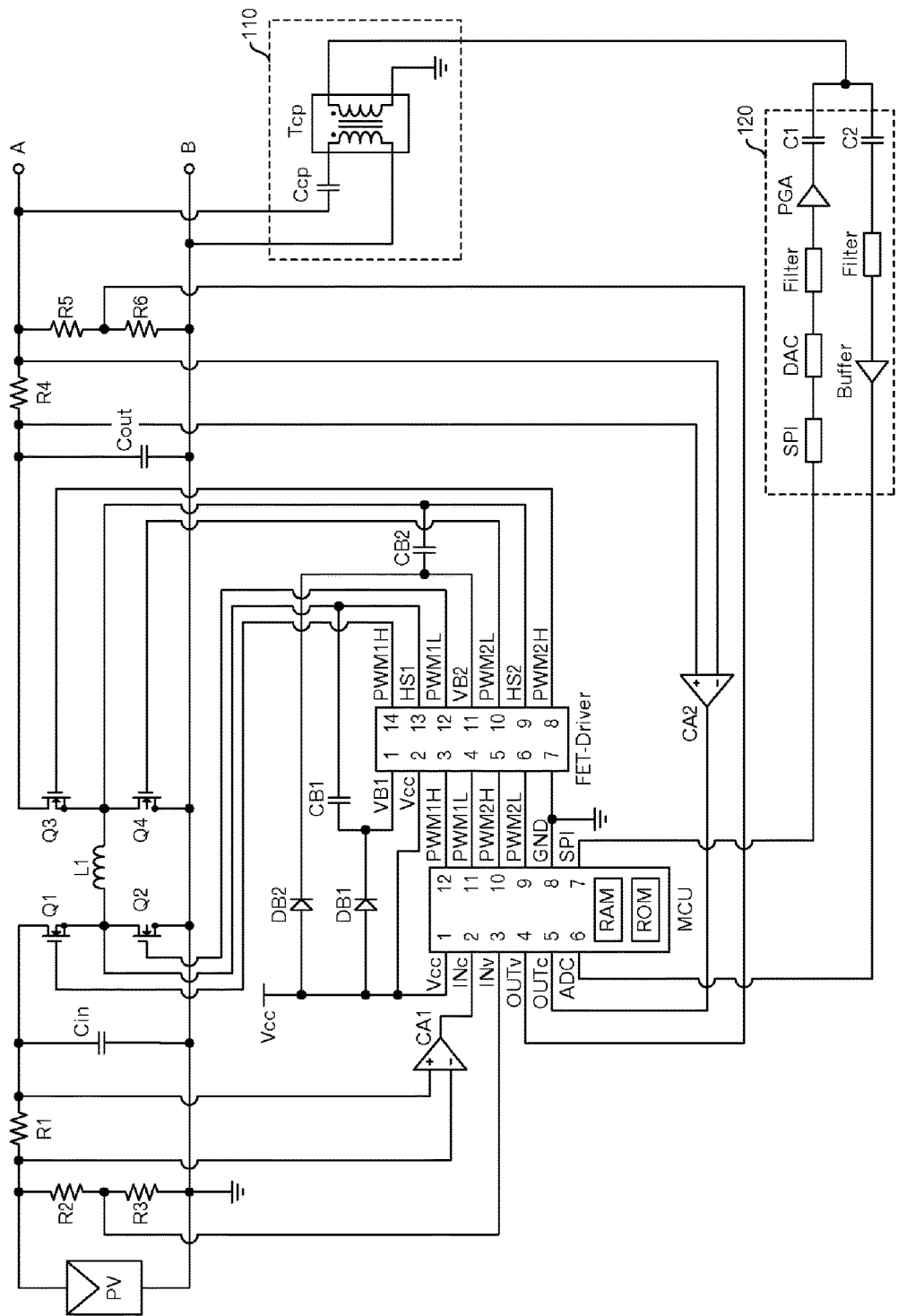
FIG. 2 is a diagram illustrating an example of the configuration of a microconverter.

FIG. 2 illustrates an example of the configuration of the microconverter 100.

The microconverter 100 according to the present embodiment includes an input voltage detecting circuit connected to the PV, an input current detecting circuit, an H bridge circuit, an output current detecting circuit, an output voltage detecting circuit, an H bridge circuit driving circuit, a microcontroller MCU, a front-end circuit 120, and a power line communication coupling circuit 110.

The input voltage detecting circuit has resistances R2 and R3, and a signal corresponding to an input voltage is inputted into a number 3 pin of the microcontroller MCU.

The input current detecting circuit has a resistance R1 and an operational amplifier CA1, and a signal corresponding to an input current is inputted into a number 2 pin of the microcontroller MCU.

The H bridge circuit has four N-channel FETs (Field Effect Transistor; a switching element) (Q1 to Q4), an inductor L1 for storing energy, and two capacitors Cin and Cout.

The output current detecting circuit has a resistance R4 and an operational amplifier CA2, and a signal corresponding to an output current is inputted into a number 5 pin of the microcontroller MCU.

The output voltage detecting circuit has resistances R5 and R6, and a signal corresponding to an output voltage is inputted into a number 4 pin of the microcontroller MCU.

The H bridge driving circuit has a FET driver IC (Integrated Circuit, FET-Driver) for driving the FETs, two capacitors CB1 and CB2 for bootstrapping, and two diodes DB1 and DB2 for bootstrapping. The FET driver IC for driving the FETs is, for example, a 14-pin IC, having four PWM (Pulse Width Modulation) inputs, two PWM high-side outputs, two PWM low-side outputs, and two high-side midpoint potentials (HS1 and HS2).

A number 1 pin of the FET driver IC for driving the FETs is connected to a cathode of the diode DB1 and one end of the capacitor CB1, and a voltage Vcc is applied to an anode of the diode DB1. The voltage Vcc is applied to a number 2 pin of the FET driver IC for driving the FETs. Number 3 to number 6 pins of the IC for driving the FETs are connected to the microcontroller MCU. A number 7 pin of the FET driver IC for driving the FETs is grounded. A number 8 pin of the FET driver IC for driving the FETs is connected to a gate of the FET (Q3). A number 9 pin of the FET driver for driving the FETs is connected to one end of the capacitor CB2 and another end of the inductor L1. A number 10 pin of the FET driver IC for driving the FETs is connected to a gate of the FET (Q4). A number 11 pin of the FET driver IC for driving the FETs is connected to another end of the capacitor CB2 and a cathode of the diode DB2. A number 12 pin of the FET driver IC for driving the FETs is connected to a gate of the FET (Q2).

A number 13 pin of the FET driver IC for driving the FETs is connected to another end of the capacitor CB1 and one end of the inductor L1. A number 14 pin of the FET driver IC for driving the FETs is connected to a gate of the FET (Q1).

The microcontroller MCU is a CPU (Central Processing Unit) that has a RAM (Random Access Memory) and a ROM (Read Only Memory).

The voltage Vcc is applied to a number 1 pin of the microcontroller MCU, and the number 2 pin is connected to an output of the input current detecting circuit. The number 3 pin of the microcontroller MCU is connected to an output of the input voltage detecting circuit, and a number 8 pin is grounded. The number 4 pin of the microcontroller MCU is connected to an output of the output voltage detecting circuit, and the number 5 pin is connected to an output of the output current detecting circuit. Furthermore, a number 9 pin of the microcontroller MCU is connected to a number 6 pin of the FET driver IC for driving the FETs, and an on-off driving signal (PWM2L) of the FET (Q4) is outputted to this number 6 pin.

A number 10 pin of the microcontroller MCU is connected to a number 5 pin of the FET driver IC for driving the FETs, and an on-off driving signal (PWM2H) of the FET (Q3) is outputted to this number 5 pin. A number 11 pin of the microcontroller MCU is connected to a number 4 pin of the FET driver IC for driving the FETs, and an on-off driving signal (PWM1L) of the FET (Q2) is outputted to this number 4 pin. A number 12 pin of the microcontroller MCU is connected to a number 3 pin of the FET driver IC for driving the FETs, and an on-off driving signal (PWM1H) of the FET (Q1) is outputted to this number 3 pin.

The power line communication coupling circuit 110 has a coupling capacitor Ccp and a coupling transformer Tcp. The power line communication coupling circuit 110 superimposes a signal used in power line communication from the front-end circuit 120 onto an output of the H bridge circuit, and conversely outputs, to the front-end circuit 120, a signal outputted from another microconverter 100 and superimposed onto the output of the H bridge circuit.

The front-end circuit 120 has a power line communication output circuit and a power line communication input circuit. The power line communication output circuit is connected to a number 7 pin of the microcontroller MCU, and has an SPI (Serial Peripheral Interface) circuit, a D/A converting circuit (DAC), a filter (Filter), a PGA (Programmable Gain Amplifier) circuit, and a capacitor C1. The power line communication input circuit is connected to a number 6 pin of the microcontroller MCU, and has a capacitor C2, a filter (Filter) and a buffer (Buffer) circuit.

The power line communication coupling circuit 110 and the front-end circuit 120 are circuits normally used in the case where power line communication is carried out, and thus no further descriptions thereof will be given.

Figure 3:
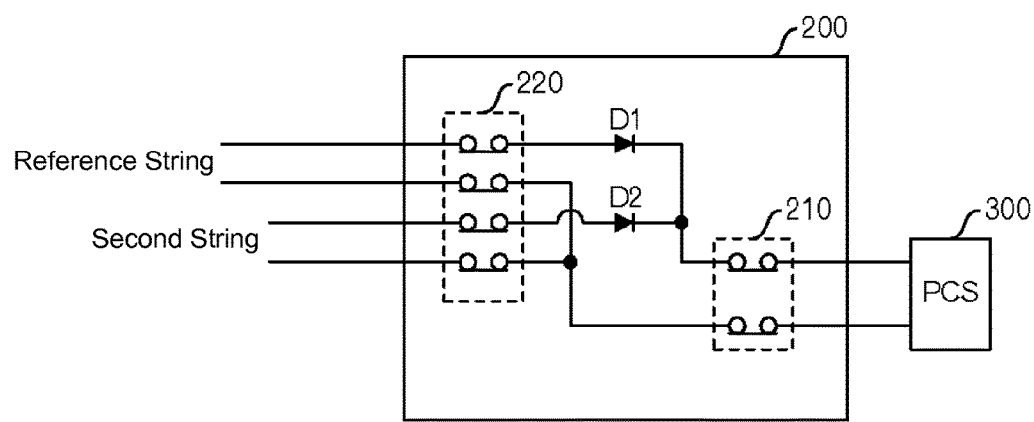
FIG. 3 is a diagram illustrating an example of circuitry in a connection box.

FIG. 3 illustrates a connection relationship between the connection box 200 and the reference string, and between the connection box 200 and the second string. The connection box 200 includes a DC breaker 210 that is connected to the PCS 300 and is a main switch, diodes D1 and D2, and a DC breaker 220.

In this manner, an output from the reference string and an output from the second string are both connected to the PCS 300 via the DC breaker 220, the diode D1 or D2, and the DC breaker 210.

Next, an overview of operations of the microconverter 100 according to the present embodiment will be given using FIG. 4 and FIG. 5.

Figure 4:
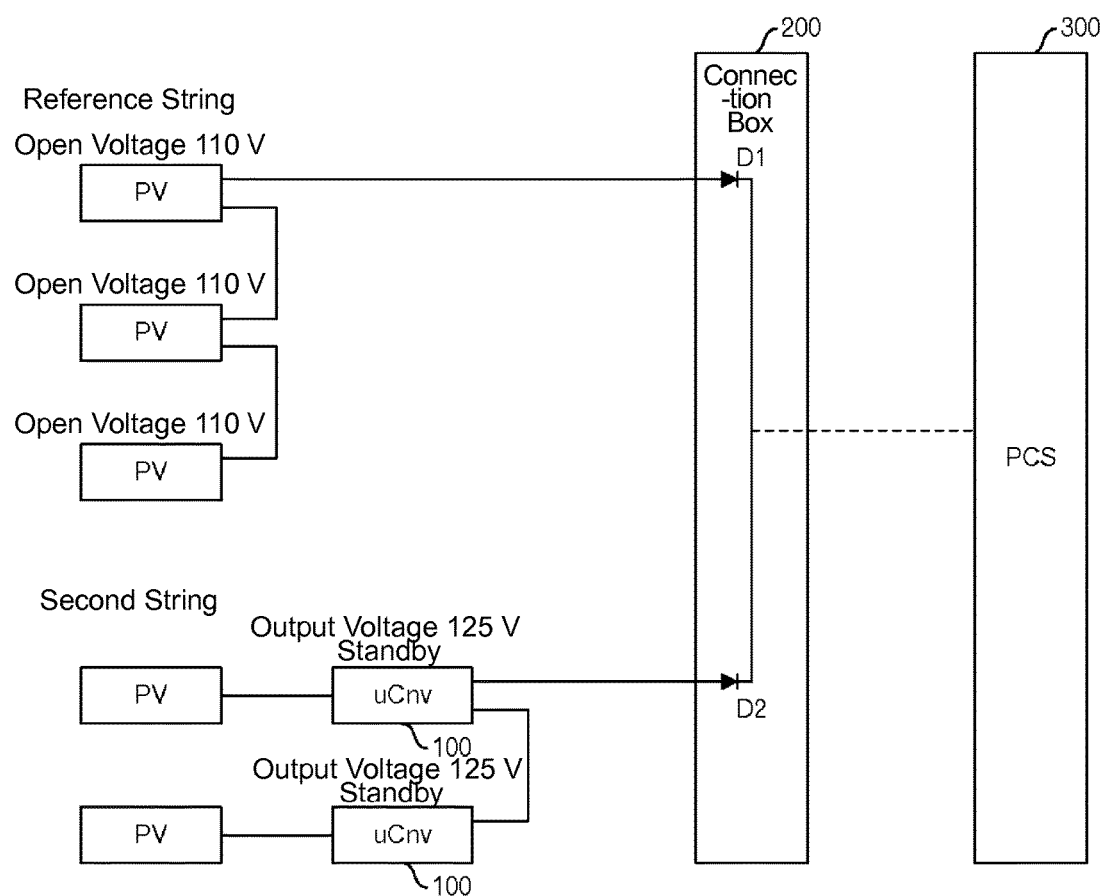
FIG. 4 is a diagram illustrating an overview of operations performed by the photovoltaic power generating system according to Embodiment 1.

In the present embodiment, as illustrated in FIG. 4, a current does not flow to the PCS 300 prior to the PCS 300 being started, and thus even if power generation using the PVs is started, the PCS 300 stands by with the reference string having three open voltages of 110V in series for a total output of 330V (less than 400V) and the second string having two output voltages of 125V in series for a total of 250V (greater than a maximum power point voltage of 240V (=80V×3) in the case where there are three PVs in series).

When the PCS 300 is started, a current flows to the PCS 300, but the current initially flows from the reference string whose output voltage is higher during standby, and thus the voltage drops toward 240V in the series of three having the maximum power point voltage of 80V. When the voltage drops to 250V, a current begins to flow from the second string, and the voltage drops to 240V. When the output voltage of the reference string is 240V, the two microconverters 100 in the second string convert the output voltages of the respective PVs so as to attain a total of 240V.

Figure 5:
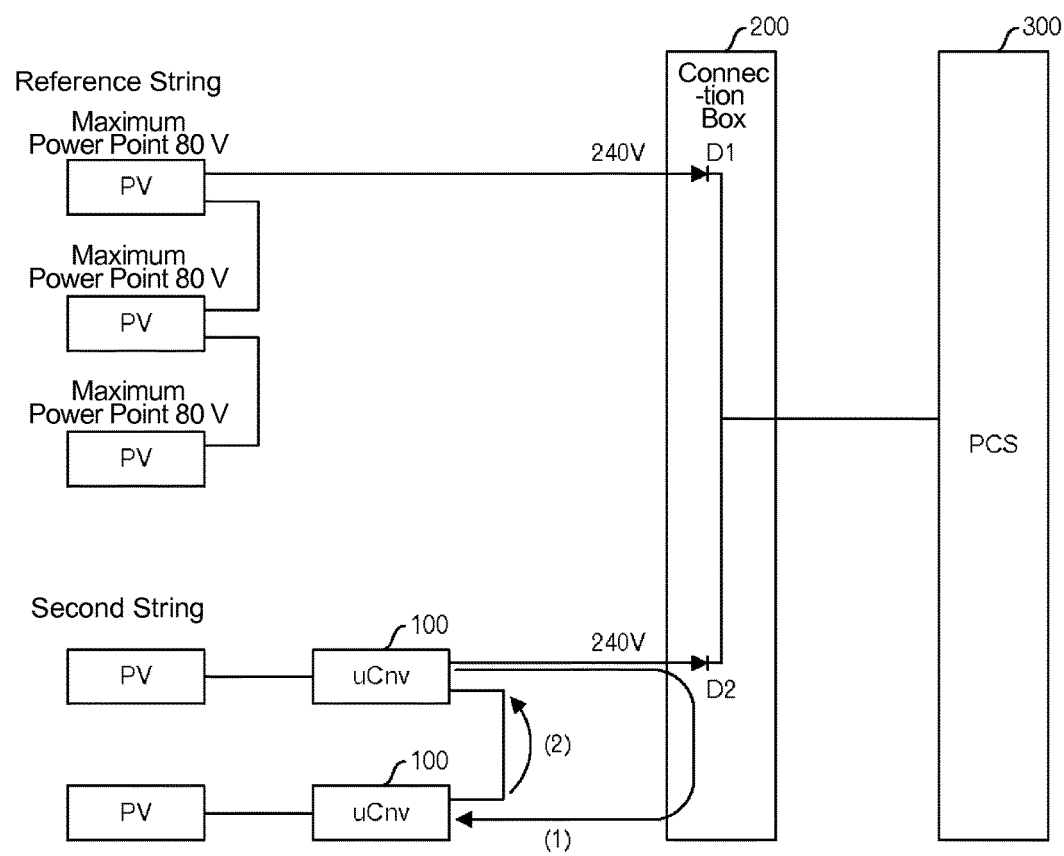
FIG. 5 is a diagram illustrating an overview of operations performed by the photovoltaic power generating system according to Embodiment 1.

Here, when the current begins to flow, the microconverters 100 in the second string exchange signals expressing identifiers of the respective microconverters 100 with each other through power line communication ((1) and (2) in FIG. 5) and automatically recognize that the number of the microconverters 100 connected in series is 2 in the second string, and the microconverters 100 then execute control for converting the input voltages from the PVs.

Note that by providing the reference string, the voltage outputted to the PCS 300 takes on a constant value (240V in the example described above), and thus the microconverters 100 in the second string operate so that the output voltage of the second string also takes on this value, which stabilizes the overall operations of the photovoltaic power generating system. More specifically, the PVs in the second string are connected in series, and thus the same current flows in each microconverter 100, and the PVs change the output current without changing the output voltage (80V, for example) based on the state of power generation. In such a case, if the output voltage in the reference string is set, a combination of a current value and a voltage value in the second string at which the maximum power is outputted is uniquely determined, and thus the operations of the microconverters 100 stabilize.

Next, specific flows of operations performed by the microconverter 100 will be described using FIG. 6A to FIG. 16. Note that the microcontroller MCU of the microconverter 100 executes a program stored in the ROM and stores mid-processing data in the RAM.

Figure 6A:
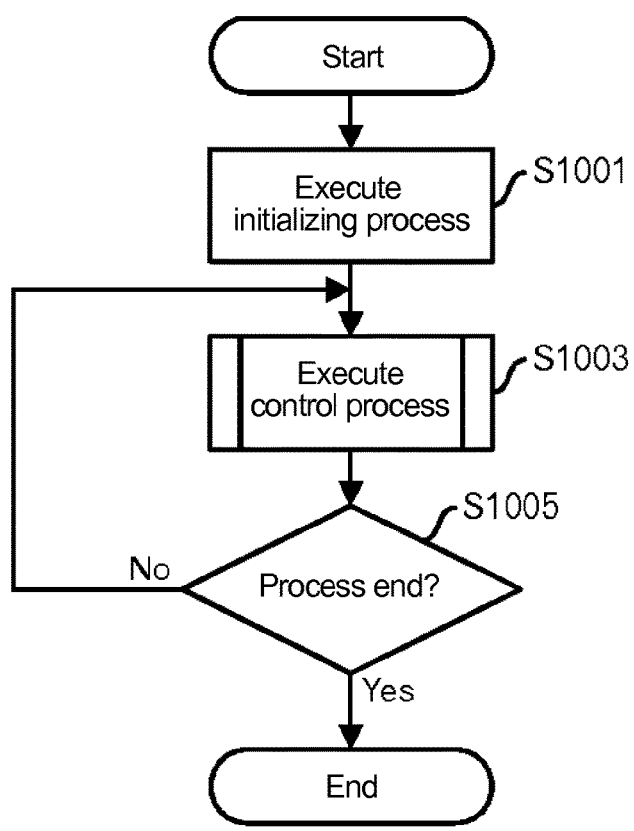
FIG. 6A is a diagram illustrating a processing flow expressing details of processing performed by a microcontroller.

First, the microcontroller MCU executes an initializing process (FIG. 6A: step S1001). For example, a present conversion ratio ConvRatio for mode selection is set to 100, a conversion ratio ConvRatioMp from one time previous is set to 100, and a maximum power value Pmpp from one time previous is set to 0. Other parameters are also initialized as appropriate. The microcontroller MCU then executes a control process (step S1003). The control process will be described in detail later. The microcontroller MCU then determines whether to end the processing (step S1005). The microcontroller MCU determines to end the processing if the supply of power is stopped, for example. The processing returns to step S1003 in the case where the processing is not ended. However, the processing ends directly in the case where the processing is ended.

Figure 6B:
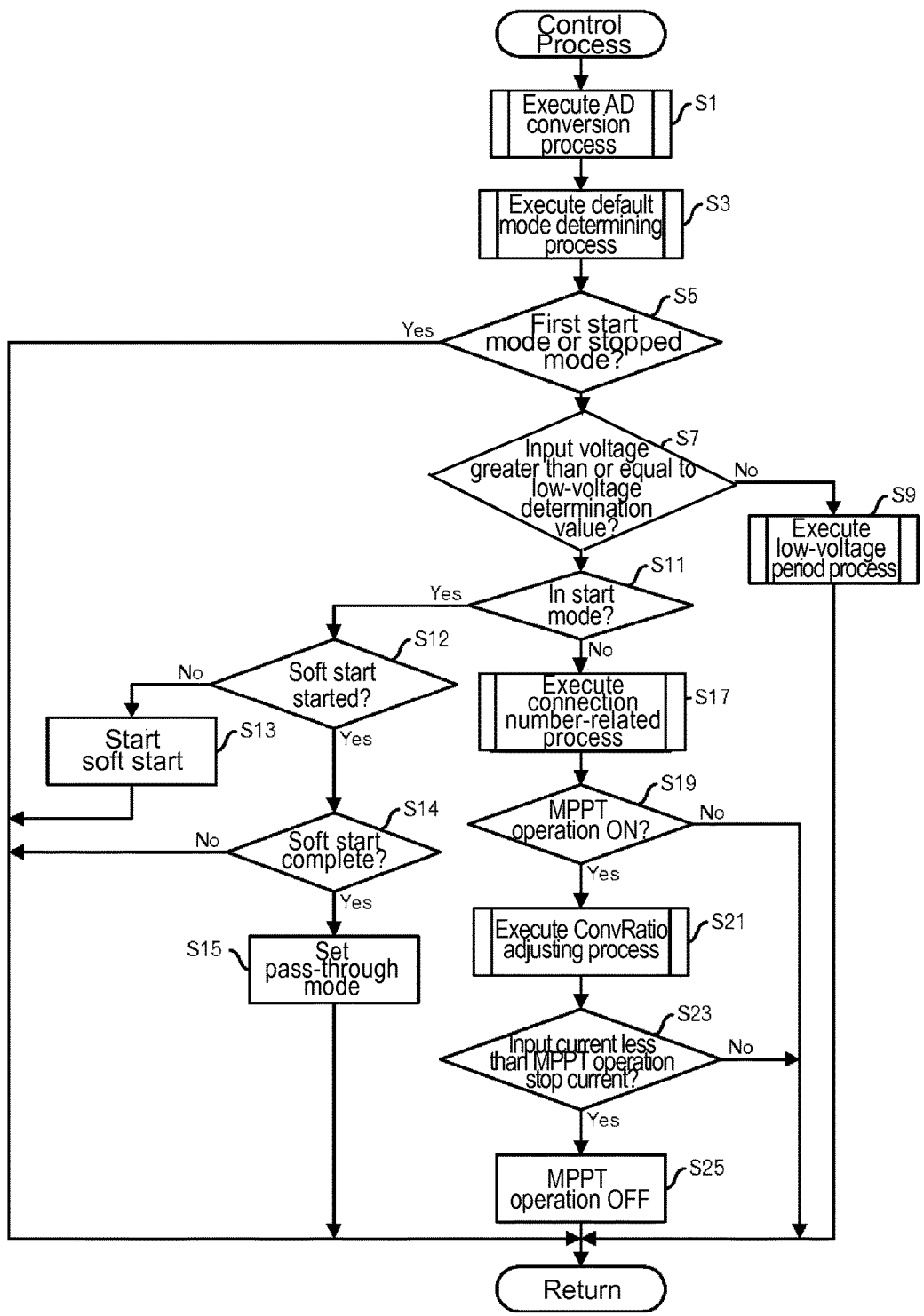
FIG. 6B is a diagram illustrating a processing flow of a control process executed by a microcontroller.
Figure 7:
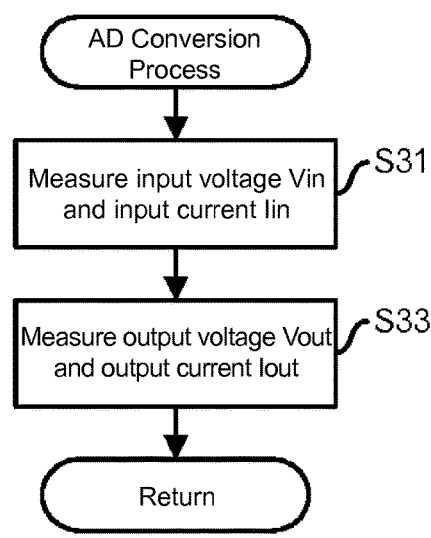
FIG. 7 is a diagram illustrating a processing flow of an AD conversion process.
Figure 8:
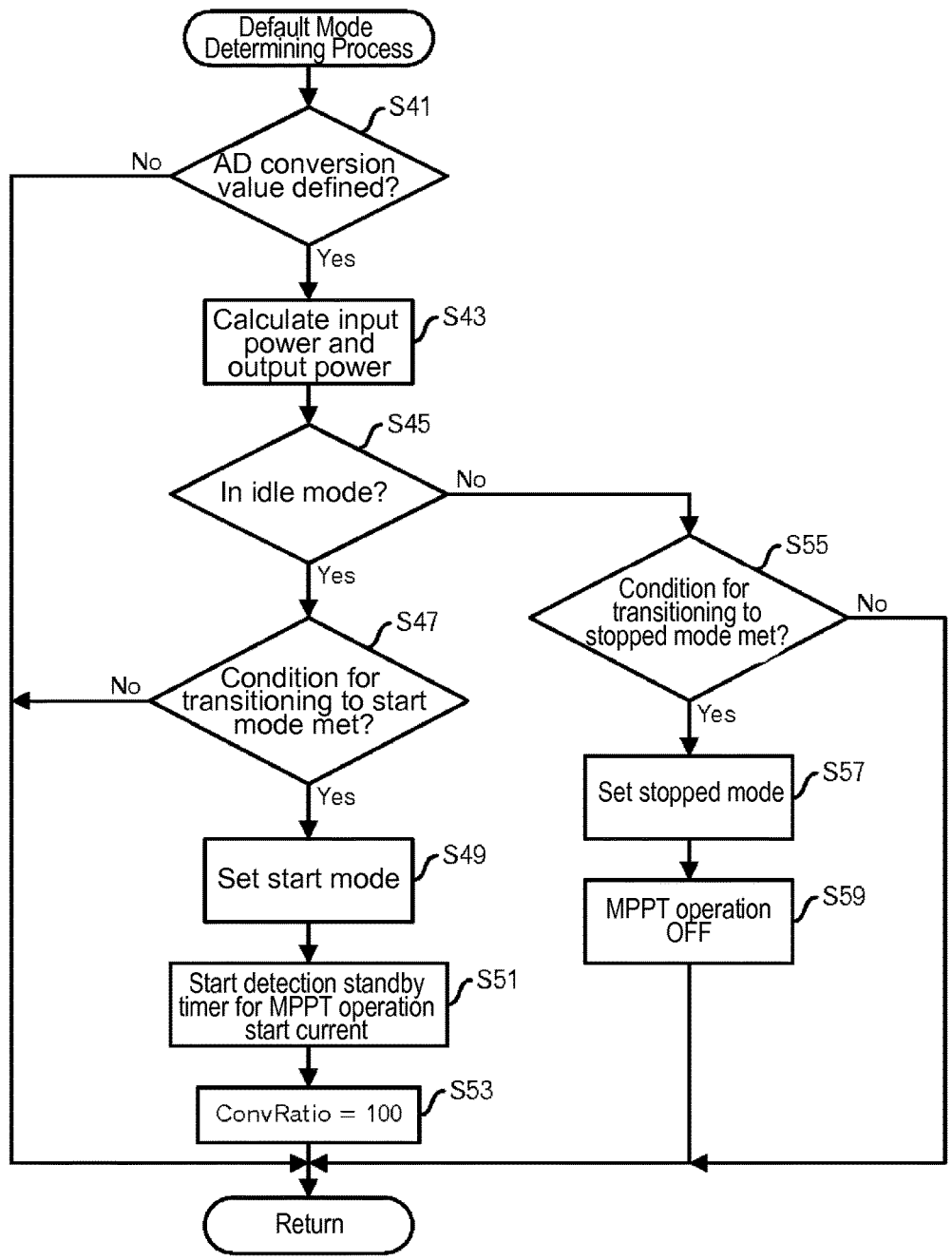
FIG. 8 is a diagram illustrating a processing flow of a default mode determining process.

Next, the control process will be described using FIG. 6B and so on. First, the microcontroller MCU executes an AD conversion process (FIG. 6B: step S1). This AD conversion process will be described using FIG. 7.

First, the microcontroller MCU measures an input voltage Vin and an input current Iin (step S31), and measures an output voltage Vout and an output current Iout (step S33). Note that the measurements may be carried out several times and an average value of those measurements may be employed. Once the measurements are complete, the processing returns to the original flow.

Returning to the descriptions of the processing illustrated in FIG. 6B, the microcontroller MCU executes a default mode determining process (step S3). This default mode determining process will be described using FIG. 8.

First, the microcontroller MCU determines whether an AD conversion value has been defined (step S41). In other words, it is determined whether or not an input voltage value and an input current value, and an output voltage value and an output current value, have been obtained. The processing returns to the original flow in the case where these values have not been obtained.

However, in the case where the input voltage value and the input current value, and the output voltage value and the output current value, have been obtained, the microcontroller MCU calculates an input power Pin from the input voltage value and the input current value and calculates an output power Pout from the output voltage value and the output current value (step S43).

Thereafter, the microcontroller MCU determines whether or not a present mode is an idle mode (step S45). If the present mode is the idle mode, the microcontroller MCU determines whether or not conditions for transitioning to a start mode are met (step S47). Specifically, it is determined whether or not a condition that the input voltage exceeds an MPPT operation start voltage (60V, for example), a condition that a temperature indicated by a temperature sensor is less than 70 degrees, a condition that an input power and an output power exceed a reference value (40 W, for example), and a condition that AD conversion has been successfully carried out a predetermined number of times (ten times, for example) are met. In the case where such conditions are not met, the processing returns to the original flow without a transition to the start mode.

However, in the case where it is determined that such conditions have been met, the microcontroller MCU sets an operating mode to the start mode (step S49). Furthermore, the microcontroller MCU starts a detection standby timer for an MPPT operation start current (step S51). In other words, the microcontroller MCU starts measuring a predetermined amount of time it is estimated to take until the PCS 300 begins operating. Approximately ten minutes are measured, for example.

Furthermore, the microcontroller MCU sets the conversion ratio ConvRatio to 100 (step S53). The processing then returns to the original flow.

Meanwhile, if the operating mode is not the idle mode, the microcontroller MCU determines whether or not a condition for transitioning to a stopped mode is met (step S55). Specifically, a condition that the input voltage is less than an MPPT stop-start voltage (30V, for example), a condition that a temperature indicated by the temperature sensor exceeds 90 degrees, a condition that the input power and the output power are less than 20 W, or a condition that the AD conversion has encountered an error a predetermined number of times (ten times, for example) is met.

In the case where such a condition is met, the microcontroller MCU sets the operating mode to the stopped mode (step S57). The microcontroller MCU then sets the MPPT operation to off (step S59). The processing then returns to the original flow. However, the processing also returns to the original flow in the case where a condition for transitioning to the stopped mode is not met.

In this manner, the processing results in one of a case of transitioning to the start mode, a case of continuing the start mode, a case of transitioning to the stopped mode, a case of continuing the stopped mode, and a case of carrying out another mode.

Generally speaking, the stopped mode is set immediately in the default mode determining process. The start mode is transitioned to thereafter. Then, the mode is changed in processing that will be described below.

Returning to the descriptions of FIG. 6B, in the case where the mode is a first start mode or the stopped mode (step S5: Yes route), the present control process is ended and the processing returns to the original flow.

However, in the case where the mode is not the first start mode (continues as the start mode) or in the case of a mode aside from the stopped mode (a pass-through mode, a step up mode, or a step down mode) (step S5: No route), the microcontroller MCU determines whether or not the input voltage is greater than or equal to a low-voltage determination value (50V, for example) (step S7).

In the case where these conditions are not met, the microcontroller MCU executes a low-voltage period process (step S9). This is a process carried out when the PV output voltage has dropped, for example. The low-voltage period process will be described using FIG. 9.

Figure 9:
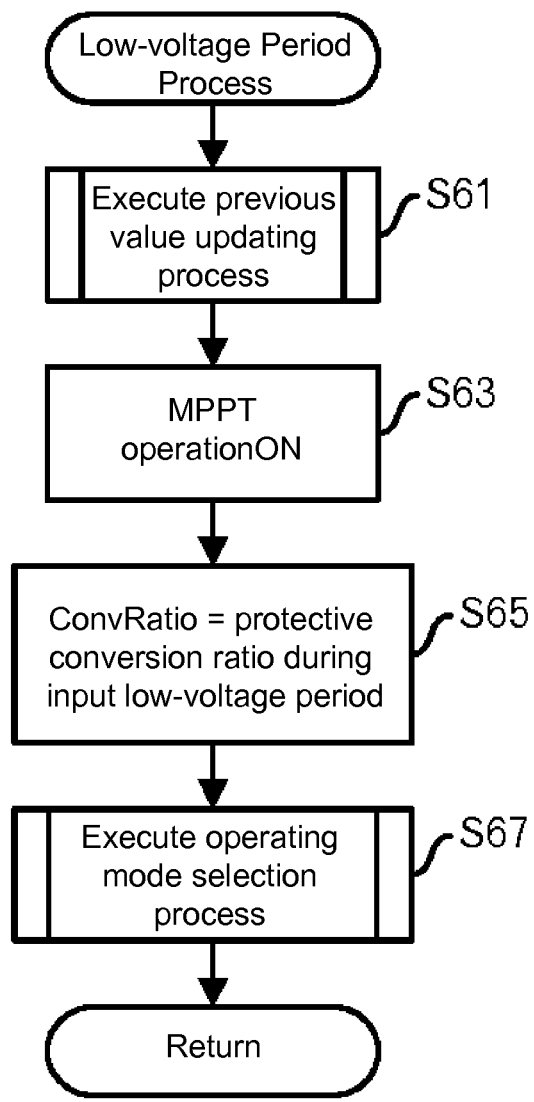
FIG. 9 is a diagram illustrating a processing flow of a low-voltage period process.

First, the microcontroller MCU executes a previous value updating process (FIG. 9: step S61). The previous value updating process will be described using FIG. 10.

Figure 10:
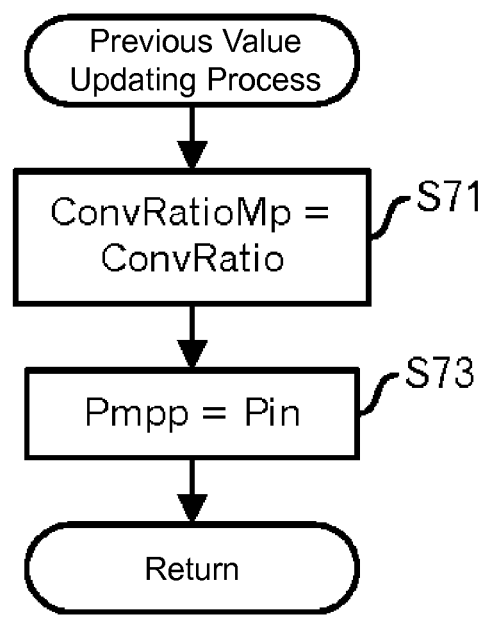
FIG. 10 is a diagram illustrating a processing flow of a previous value updating process.
Figure 11:
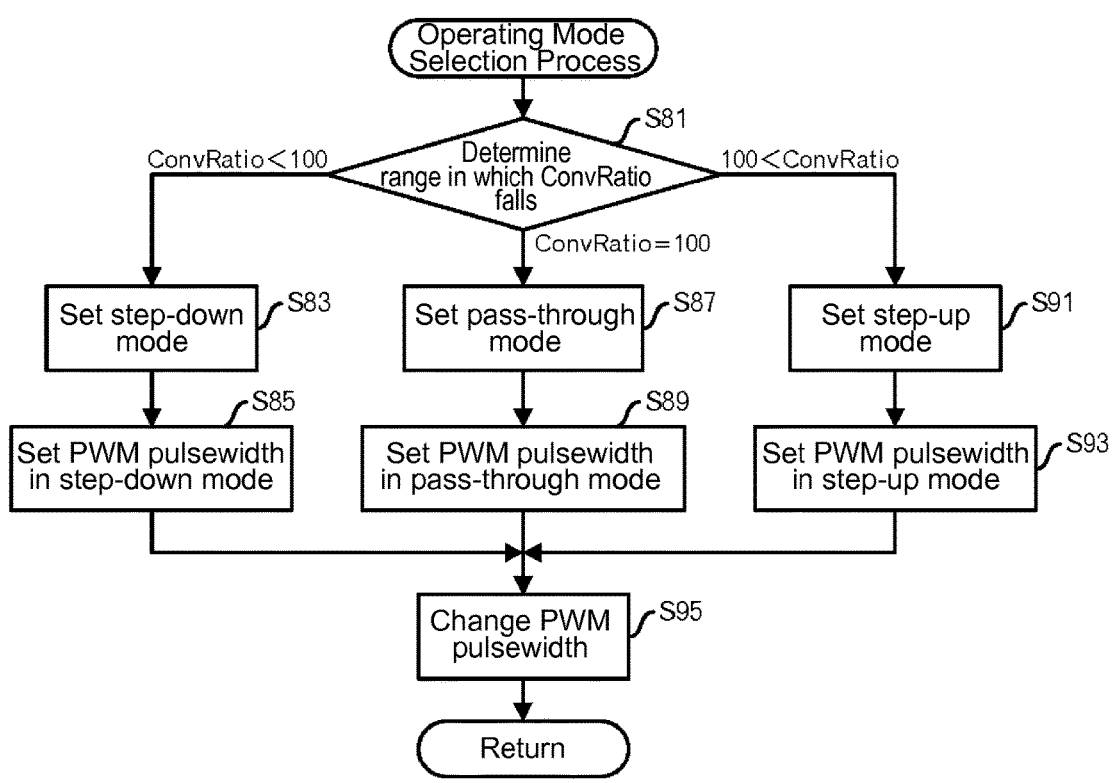
FIG. 11 is a diagram illustrating a processing flow of an operating mode selection process.

First, the microcontroller MCU sets the present conversion ratio ConvRatio to ConvRatioMp (FIG. 10: step S71). In addition, the microcontroller MCU sets the present input power Pin to the Pmpp one previous (step S73). The microcontroller MCU then sets the output power Pout to an output power Pmppo one previous. The processing then returns to the original process.

Returning to the descriptions of FIG. 9, the microcontroller MCU sets the MPPT operation to on (step S63). This is to handle the case where the MPPT operation is set to off in step S25 and so on, for example.

Furthermore, the microcontroller MCU sets the ConvRatio to a predetermined protective conversion ratio (20, for example) used during an input low voltage (step S65). Furthermore, the microcontroller MCU executes an operating mode selection process based on the ConvRatio set in step S65 (step S67). Note that after this process is executed, the processing returns to the original flow. This operating mode selection process will be described using FIG. 11.

First, the microcontroller MCU determines a range into which the ConvRatio falls (step S81). Specifically, the microcontroller MCU determines whether the ConvRatio=100, and when such is the case, sets the operating mode to the pass-through mode (step S87).

The microcontroller MCU then sets a PWM pulsewidth used in the pass-through mode (step S89). Furthermore, the microcontroller MCU changes the present PWM pulsewidth to the set PWM pulsewidth (step S95). In the case of the pass-through mode, the PWM pulsewidth is set so as to maintain the input voltage from the PV. Specific control of the PWM pulsewidth with respect to an H bridge circuit is generally known and thus descriptions thereof will be omitted here.

In addition, the microcontroller MCU determines whether the ConvRatio exceeds 100, and when such is the case, sets the operating mode to the step up mode (step S91).

The microcontroller MCU then sets a PWM pulsewidth used in the step up mode (step S93). Furthermore, the microcontroller MCU changes the present PWM pulsewidth to the set PWM pulsewidth (step S95). In the case of the step up mode, the PWM pulsewidth is set so as to attain an output voltage equivalent to the input voltage from the PV×(ConvRatio−100)/ConvRatio, for example.

In addition, the microcontroller MCU determines whether the ConvRatio is less than 100, and when such is the case, sets the operating mode to the step down mode (step S83).

The microcontroller MCU then sets a PWM pulsewidth used in the step down mode (step S85). Furthermore, the microcontroller MCU changes the present PWM pulsewidth to the set PWM pulsewidth (step S95). In the case of the step down mode, the PWM pulsewidth is set so as to attain an output voltage equivalent to the input voltage from the PV×ConvRatio/100, for example.

In this manner, the ConvRatio is increased to exceed 100 when circumstances in other processes call for stepping up, and the ConvRatio is reduced to fall below 100 when circumstances in other processes call for stepping down.

Returning to the descriptions of FIG. 6B, when it is determined in step S7 that the input voltage is greater than or equal to the low-voltage determination value, the microcontroller MCU determines whether or not the operating mode is the start mode (step S11). If the operating mode is the start mode, the microcontroller MCU determines whether or not a soft start operation for starting PWM has been started (step S12). In the case where this step is reached during the first start mode, it is determined that the stated operations have not been started. When such is the case, the microcontroller MCU starts the soft start operation (step S13). In other words, a PWM pulsewidth corresponding to the soft start operation is set and outputted. The present control process then ends and the processing returns to the original flow.

However, in the case where the soft start operation has already started, the microcontroller MCU determines whether or not the soft start operation has been completed (step S14). If the soft start operation is not complete, the present control process is ended and the processing returns to the original flow.

Meanwhile, in the case where the soft start operation has been completed, the microcontroller MCU sets the operating mode to the pass-through mode (step S15). In the pass-through mode, the FETs (Q1 to Q4) for the H bridge circuit are caused to switch so that the input voltage from the PV is outputted without being stepped up or stepped down. The present control process then ends and the processing returns to the original flow.

Meanwhile, in the case where the operating mode is not the start mode, the microcontroller MCU executes a connection number-related process (step S11). The connection number-related process will be described using FIG. 12.

Figure 12:
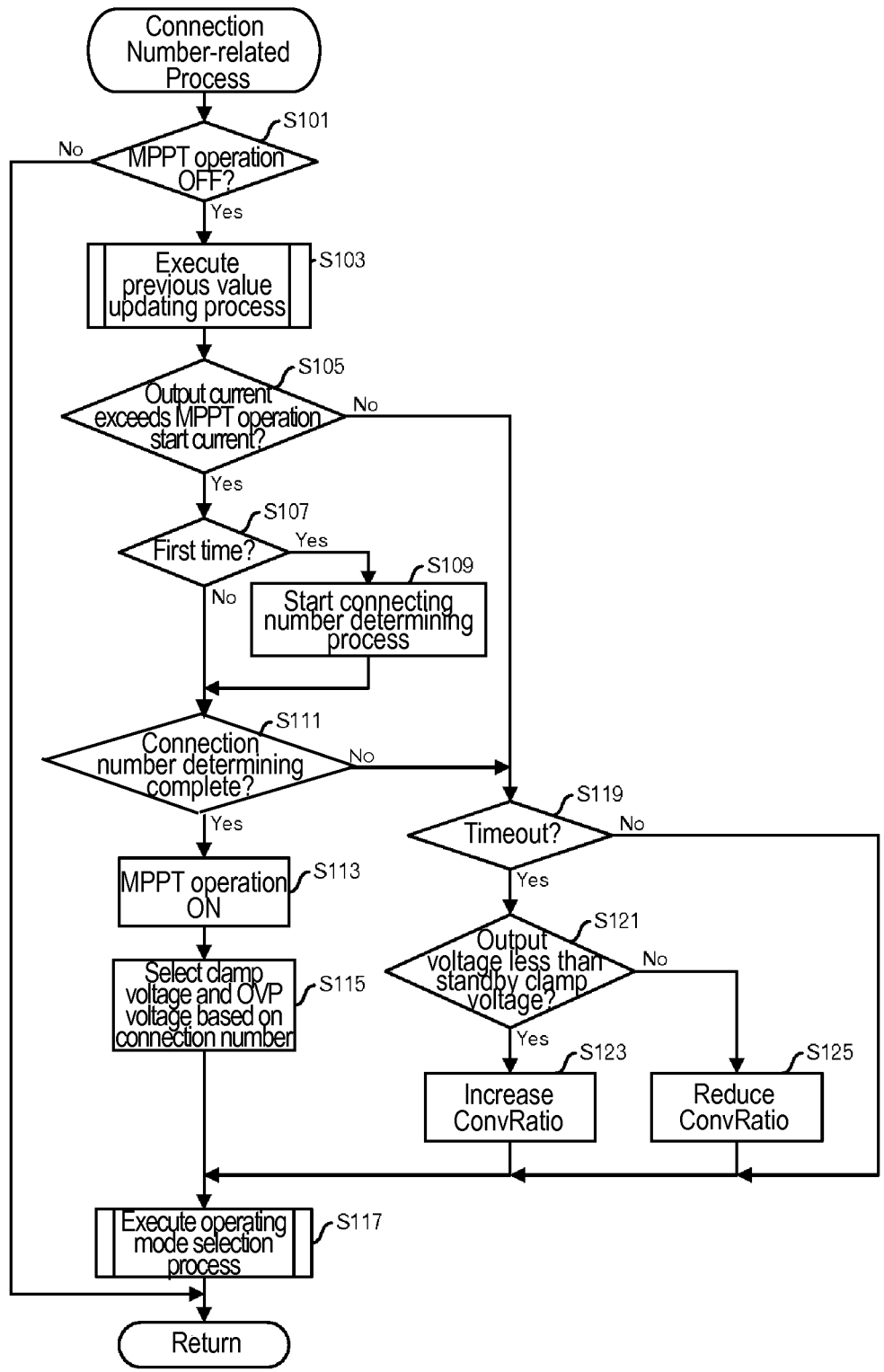
FIG. 12 is a diagram illustrating a processing flow of a connection number-related process.

First, the microcontroller MCU determines whether or not the MPPT operation is off (FIG. 12: step S101). The processing returns to the original flow in the case where the MPPT operation is on.

However, if the MPPT operation is off, the microcontroller MCU executes a previous value updating process (step S103). This process is the same as the process of FIG. 10, and thus descriptions will be omitted here.

The microcontroller MCU then determines whether or not the output current has exceeded a predetermined MPPT operation start current (250 mA, for example) (step S105). A current flows toward the PCS 300 when the PCS 300 operates. However, no current flows when the PCS 300 is not operating. In other words, initially, the output current does not exceed the MPPT operation start current.

In the case where the output current does not exceed the MPPT operation start current, the microcontroller MCU determines whether the detection standby timer for the MPPT operation start current has timed out (step S119). The processing moves to step S117 in the case where the detection standby timer has not timed out.

However, in the case where the detection standby timer has timed out, the microcontroller MCU determines whether the output voltage is less than a standby clamp voltage (125V, for example) (step S121). In the case where the output voltage is not less than the standby clamp voltage, the microcontroller MCU reduces the ConvRatio by a predetermined value (step S125). The processing then moves to step S117. However, in the case where the output voltage is less than the standby clamp voltage, the microcontroller MCU increases the ConvRatio by a predetermined value (S123). The processing then moves to step S117. In other words, the microcontroller MCU operates so as to hold the output voltage at 125V, as described using FIG. 4.

Meanwhile, in the case where the output current has exceeded the MPPT operation start current, the microcontroller MCU determines whether or not the output current has exceeded the MPPT operation start current for the first time (step S107). In the case where the output current has exceeded the MPPT operation start current for the first time, the microcontroller MCU starts the connection number determining process (step S109). Here, communication is carried out among the microconverters 100 connected in series in the second string in order to autonomously identify the number of microconverters (=the number of PVs) connected in series. This connection number determining process will be described later. The processing then moves to step S111.

In the case where the output current has already exceeded the MPPT operation start current, the microcontroller MCU determines whether the connection number determining has been completed (step S111). The connection number determining process takes a certain amount of time (approximately 10 seconds, for example), and thus the processing moves to step S119 if the connection number determining is not complete. In other words, the processing enters a standby state until the connection number determining is complete.

Meanwhile, if the connection number determining is complete, the microcontroller MCU sets the MPPT operation to on (step S113). The microcontroller MCU then selects and sets a clamp voltage and an OVP (Over Voltage Protection) voltage based on the number of connections (step S115). For example, a distinction is made between connection numbers of "2" and "3" in the present embodiment, and thus, as indicated in FIG. 13, the clamp voltage and OVP voltage for the case where the connection number (that it, the number of PVs in series) is "2" and the clamp voltage and OVP voltage for the case where the connection number is "3" are stored in the ROM in advance; one of these sets of values is read out and set.

Furthermore, the microcontroller MCU executes an operating mode selection process (step S117). This process is the process illustrated in FIG. 11. The processing then returns to the original flow.

In this manner, standby processing is carried out until communication among the microconverters 100 starts and the connection number is defined, and settings are made based on the connection number once the connection number is defined.

Returning to the descriptions of FIG. 6B, the microcontroller MCU determines whether or not the MPPT operation is on (step S19). The present processing ends if the MPPT operation is off.

However, if the MPPT operation is on, the microcontroller MCU executes a ConvRatio adjusting process (step S21). The ConvRatio adjusting process will be described using FIG. 14.

First, the microcontroller MCU determines whether or not the output voltage is less than the clamp voltage that is set (step S131). In the case where the output voltage is greater than or equal to the clamp voltage, the microcontroller MCU executes a previous value updating process (step S133). This process is the process of FIG. 10. The microcontroller MCU then reduces the ConvRatio by a predetermined value (step S135). Thereafter, the microcontroller MCU executes an operating mode selection process based on this ConvRatio (step S137). The operating mode selection process is the process of FIG. 11. The processing then returns to the original flow.

Meanwhile, if the output voltage is less than the clamp voltage, the microcontroller MCU determines whether or not it is presently a timing for carrying out MPPT control (step S139). In the present embodiment, the PWM pulsewidth is changed at predetermined intervals (that is, each MPPT control period), and thus it determined whether or not a timing for changing the PWM pulsewidth has been reached. The processing returns to the original flow in the case where it is not presently a timing for the change.

However, if the timing for carrying out MPPT control is reached, the microcontroller MCU starts measuring the MPPT control period (step S141). The microcontroller MCU then determines whether or not three microconverters 100 are connected in series based on the connection number of the microconverters in the connected string (step S143).

In the case where three are not connected in series, or in other words, if there are two or fewer in the series, the processing moves to step S145.

However, if there are three microconverters 100 connected in series in the string to which the microcontroller MCU is connected, the microcontroller MCU determines whether or not an output power change amount is less than a determination value (step S147). The output power change amount is a difference between the present output power Pout and the output power Pmppo one previous, and it is determined whether or not this amount is less than 1 W, for example. In the case where this condition is met, the operations are stable, and thus the processing moves to step S149. However, in the case where this condition is not met, the operations are unstable, and thus the processing moves to step S145.

Furthermore, if the output power change amount is less than the determination value, the microcontroller MCU determines whether or not the output voltage is greater than or equal to the maximum power point voltage+α (2V, for example) (step S149). In the case where the operations are stable, this condition is met, and thus the processing moves to step S151. However, in the case where this condition is not met, the processing moves to step S145.

When it is determined that the condition is not met in any one of step S143, step S147, and step S149, the microcontroller MCU executes an adjusting process (step S145). When the adjusting process ends, the processing moves to step S155. The adjusting process will be described using FIG. 15.

First, the microcontroller MCU measures the input voltage and the input current (step S161). The microcontroller MCU then calculates the input power Pin as the input voltage x the input current (step S163).

Then, the microcontroller MCU determines whether or not the input power Pin<the input power Pmpp one previous (step S165). In the case where this condition is met, the microcontroller MCU determines whether or not ConvRatio<ConvRatioMp (step S167). In the case where this condition is met, the processing moves to step S177. However, in the case where this condition is not met, the processing moves to step S169.

In the case where the condition Pin<Pmpp is not met, the microcontroller MCU determines whether or not ConvRatio<ConvRatioMp (step S175). In the case where this condition is met, the processing moves to step S169.

However, in the case where this condition is not met, the processing moves to step S177.

In step S169, the microcontroller MCU sets the present ConvRatio to the ConvRatioMp one previous. Furthermore, the microcontroller MCU sets the present Pin to the Pmpp one previous (step S171). The present Pout is also set to the Pmppo one previous. The microcontroller MCU then reduces the ConvRatio by a predetermined value (step S173). The processing then returns to the original flow.

Meanwhile, in step S177, the microcontroller MCU sets the present ConvRatio to the ConvRatioMp one previous. Furthermore, the microcontroller MCU sets the present Pin to the Pmpp one previous (step S179). The present Pout is also set to the Pmppo one previous. The microcontroller MCU then increases the ConvRatio by a predetermined value (step S181). The processing then returns to the original flow.

By executing such processing, the ConvRatio is increased in the case where the input power is decreasing and the ConvRatio has decreased or in the case where the input power is increasing and the ConvRatio is increasing. On the other hand, the ConvRatio is reduced in the case where the input power is decreasing and the ConvRatio has increased or in the case where the input power is increasing and the ConvRatio is decreasing.

Figure 14:
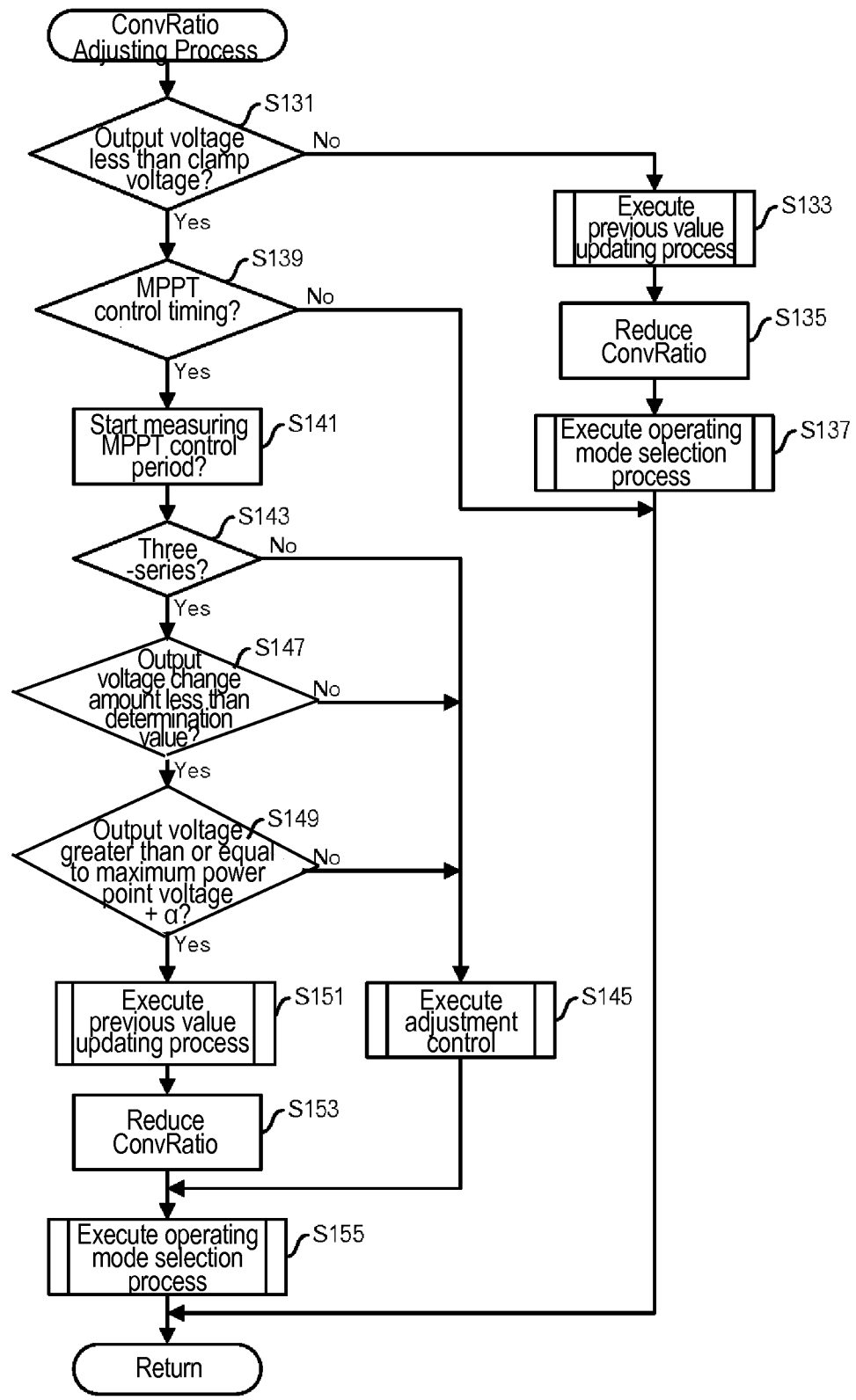
FIG. 14 is a diagram illustrating a processing flow of a ConvRatio adjustment process.
Figure 15:
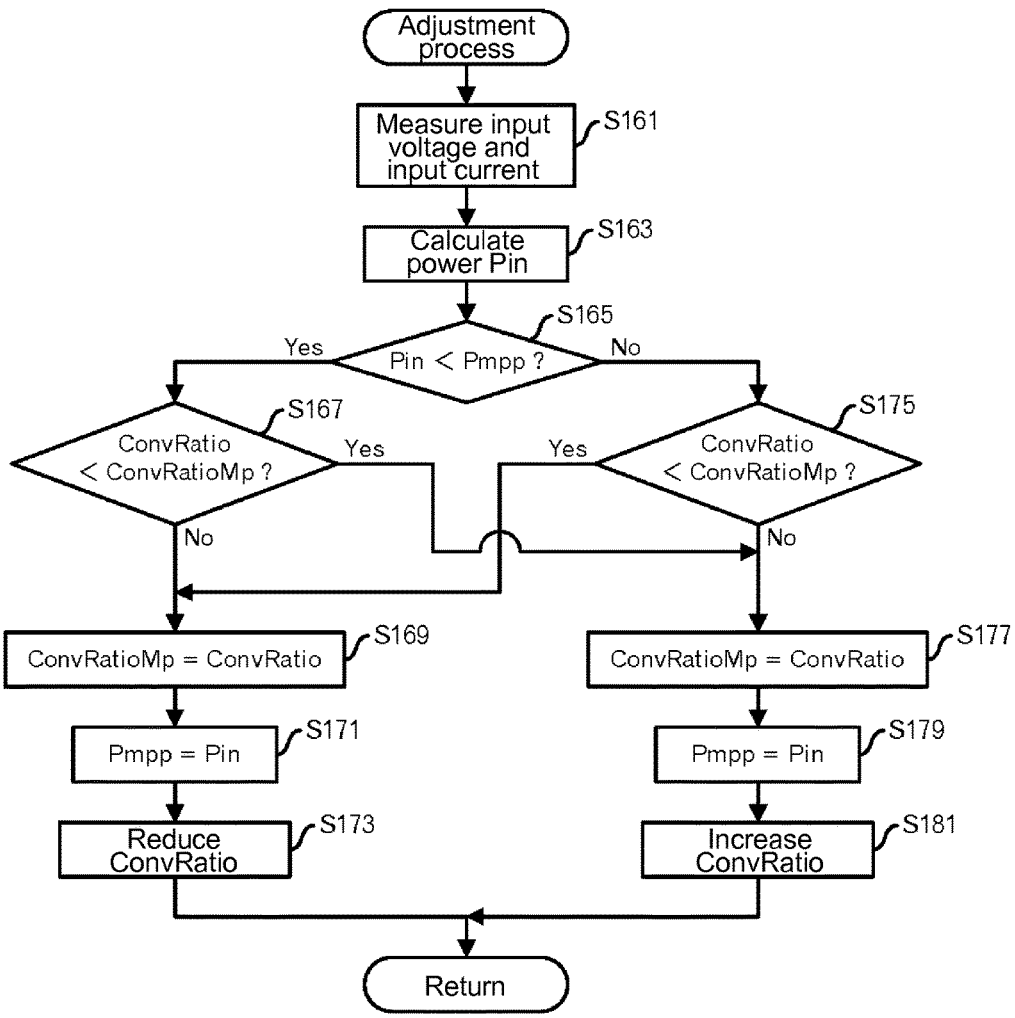
FIG. 15 is a diagram illustrating a processing flow of an adjustment process.

Returning to the descriptions of FIG. 14, in the case where the conditions of step S143, step S147, and step S149 have been met, the operations are considered stable and the adjusting process is therefore not carried out, and the microcontroller MCU executes a previous value updating process (step S151). This process is the process of FIG. 10. The microcontroller MCU then reduces the ConvRatio by a predetermined value (step S153).

Thereafter, the microcontroller MCU executes an operating mode selection process (step S155). The operating mode selection process is the process of FIG. 11. The processing then returns to the original flow.

Returning to the descriptions of FIG. 6B, when step S21 is executed, the microcontroller MCU determines whether or not the input current is less than an MPPT operation stop current (step S23). In the case where this condition is not met, the present processing ends. However, in the case where such a condition is met, the input current from the PV is decreasing, and thus the microcontroller MCU sets the MPPT operation to off (step S25). The present processing then ends. Even if step S25 has been executed, the connection number value continues to be held assuming that the connection number determining has been completed.

By executing processing such as that described above, control is executed based on the connection number of the microconverters 100 connected in each string, and the PWM pulsewidth is set so that the appropriate output voltage control is carried out.

Figure 16:
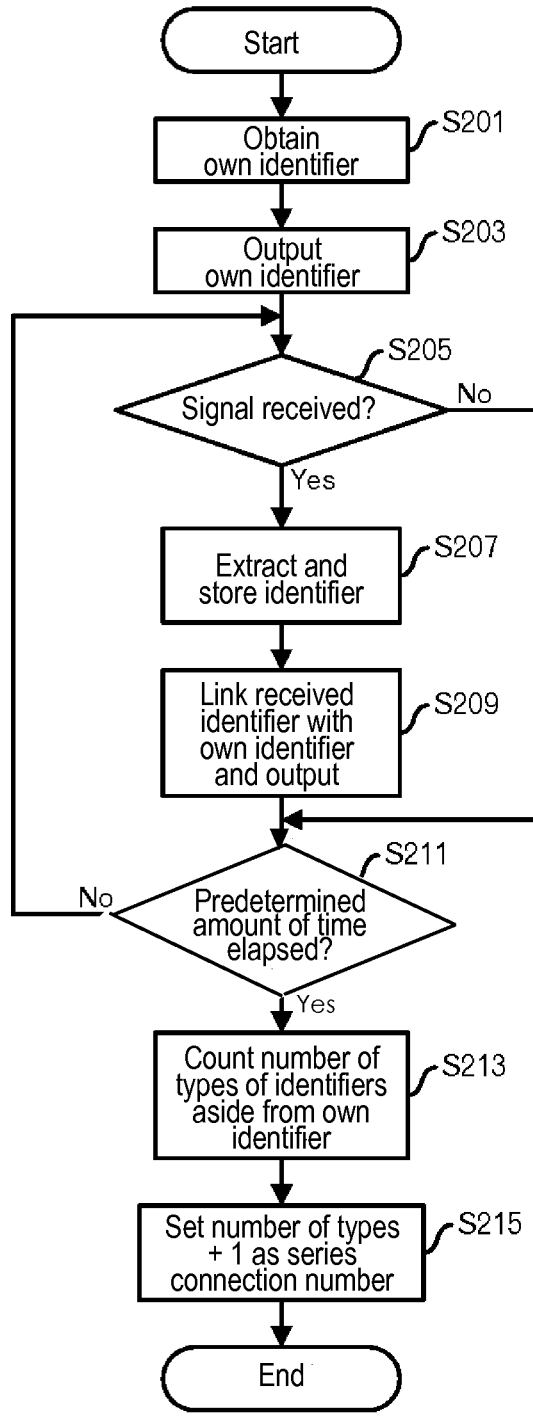
FIG. 16 is a diagram illustrating a processing flow of a connection number determining process.

The connection number determining process will be described next using FIG. 16.

First, the microcontroller MCU obtains an identifier generated by that microcontroller MCU itself (step S201). For example, if a unique identifier is already recorded in the ROM, that identifier is read out. However, if a unique identifier is not recorded in the ROM, the identifier is generated using a random number, for example, and is written into the RAM.

Then, the microcontroller MCU outputs the obtained identifier generated by that microcontroller MCU itself (step S203). Then, the microcontroller MCU determines whether or not a signal superimposed on the output of the microconverter 100 has been received (step S205). In the case where the signal is not received, the processing moves to step S211. However, in the case where the signal has been received, the microcontroller MCU extracts the identifier from the received signal and stores the identifier in the RAM (step S207). Furthermore, the microcontroller MCU links the identifier the microcontroller MCU generated itself with the received identifier and outputs the identifiers (step S209). The processing then moves to step S211.

In step S211, the microcontroller MCU determines whether or not a predetermined amount of time has elapsed following step S201, for example. The processing returns to step S205 in the case where the predetermined amount of time has not elapsed. There are cases where startup timings differ even within the same string, and thus the identifiers received in the predetermined amount of time are stored in this manner.

In the case where the predetermined amount of time has elapsed, the microcontroller MCU counts, among the identifiers stored in the RAM, a number of types of identifiers aside from the identifier the microcontroller MCU itself generated (step S213). For example, if an identifier "B" is received first and the identifier generated by the microcontroller MCU itself is "A", signals "B", "BAB", "BABAB", and so on are received and stored. Accordingly, it can be seen that there is one type of identifier aside from the identifier generated by the microcontroller MCU itself. Note that there are two types of identifiers in the case where signals "B", "BACB", "BACBACB", and so on have been received.

The microcontroller MCU then sets the number of types+1 as a series connection number for the string to which the microcontroller MCU is connected (step S215).

In this manner, the series connection number of the connected string is specified. Note that the microcontroller MCU may simply continue to output the identifier generated by the microcontroller MCU itself every predetermined interval.

According to the present embodiment as described above, the series connection number can be specified automatically through communication rather than setting the series connection number in the microconverter 100 manually, and control can then be executed autonomously based on a result of specifying the series connection number.

Note that the process illustrated in FIG. 6B runs when there is a power supply from the PV, and thus communication is carried out approximately once each day. In the case where a PV in the second string has failed, the series connection number decreases starting on the next day. In the case where three PVs are connected in series but the series has dropped substantially to two due to one of the PVs failing, for example, the series of two PVs is autonomously recognized the following day and the control is executed.

Embodiment 2

Figure 17:
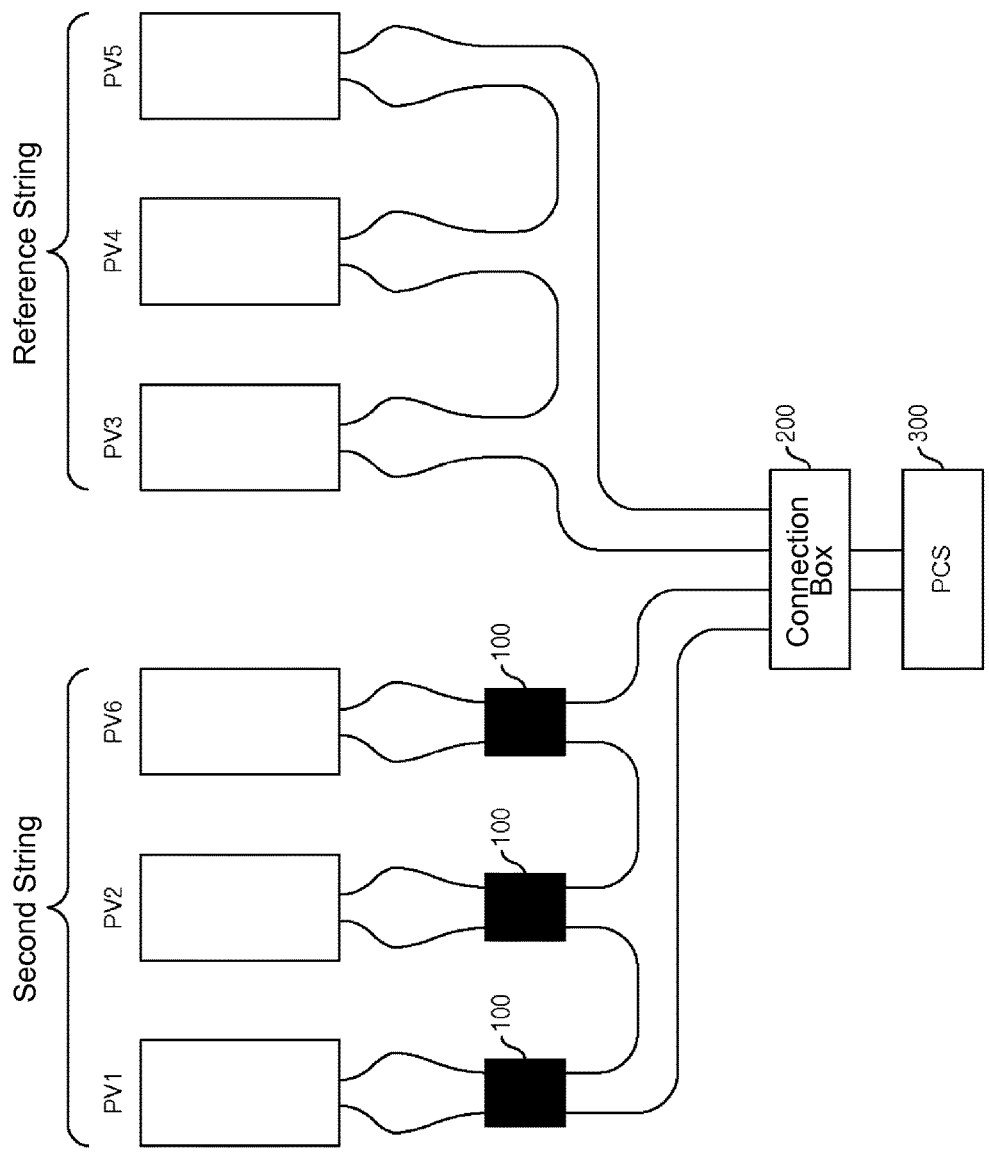
FIG. 17 is a diagram illustrating an overview of a photovoltaic power generating system according to Embodiment 2.

The present embodiment describes a case where three PVs are connected in series in the second string, as illustrated in FIG. 17. In the example illustrated in FIG. 17, a PV 1, a PV 2, and a PV 6 are connected in series in the second string. The microconverter 100 connected to each PV is the same as the microconverter 100 illustrated in Embodiment 1. Furthermore, the number of strings is the same as in Embodiment 1, and thus the configuration of the connection box 200 is also the same.

Next, an overview of operations of a photovoltaic power generating system according to the present embodiment will be given using FIG. 18 and FIG. 19.

Figure 18:
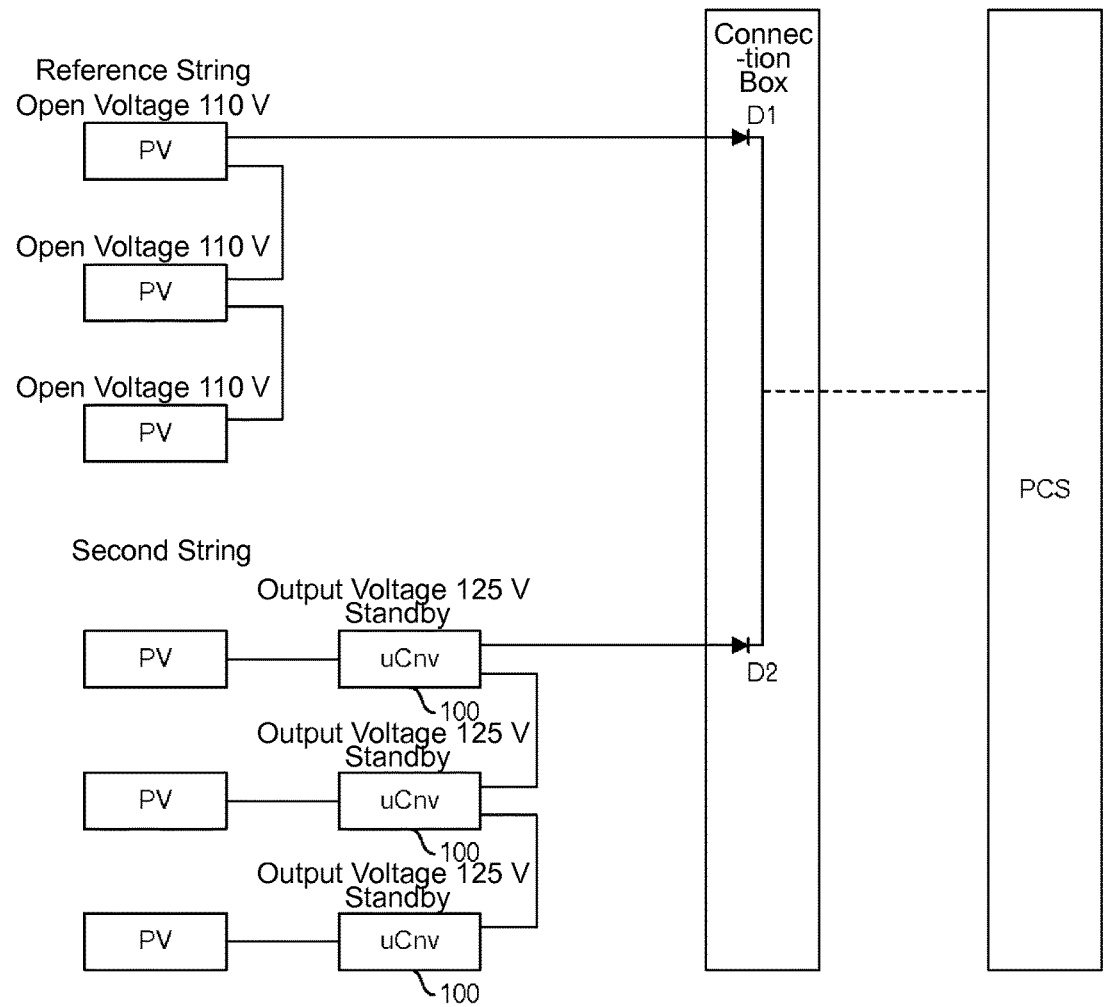
FIG. 18 is a diagram illustrating an overview of operations performed by the photovoltaic power generating system according to Embodiment 2.

In the present embodiment, as illustrated in FIG. 18, a current does not flow to the PCS 300 prior to the PCS 300 being started, and thus even if power generation using the PVs is started, the PCS 300 stands by with the reference string having three open voltages of 110V in series for a total output of 330V (less than 400V) and the second string having three output voltages of 125V in series for a total of 375V (greater than a maximum power point voltage of 240V (=80V×3) in the case where there are three PVs in series).

When the PCS 300 is started, a current flows to the PCS 300, but the current initially flows from the second string whose output voltage is higher during standby, and thus the voltage drops toward 240V in the three PVs in series having the maximum power point voltage of 80V. When the voltage in the second string drops to 330V, a current begins to flow from the reference string, and the input voltage of the PCS 300 drops to 240V. When the output voltage of the reference string is 240V, the three microconverters 100 in the second string convert the output voltages of the respective PVs so as to attain a total of 240V.

Figure 19:
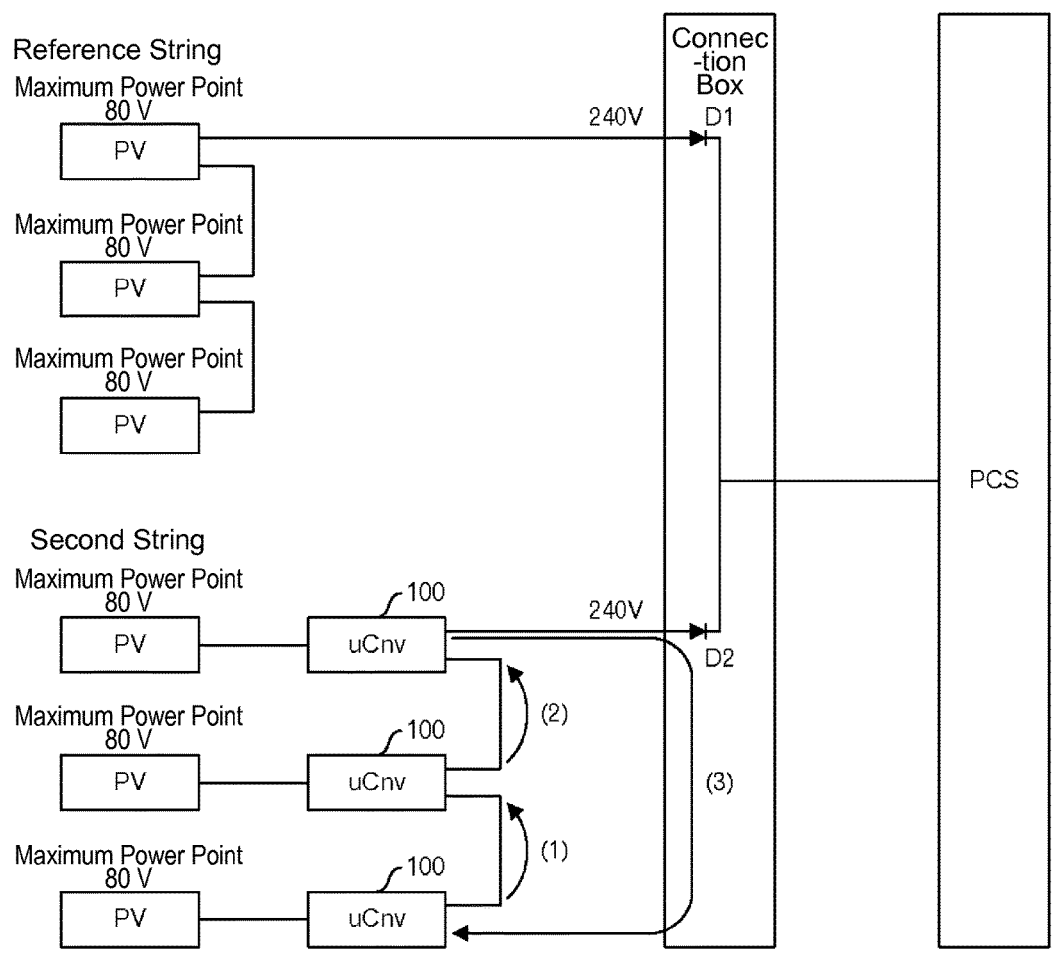
FIG. 19 is a diagram illustrating an overview of operations performed by the photovoltaic power generating system according to Embodiment 2.

Here, when the current begins to flow, the microconverters 100 in the second string exchange signals expressing identifiers of the respective microconverters 100 with each other through power line communication ((1) to (3) in FIG. 19) and automatically recognize that the number of the microconverters 100 connected in series is 3 in the second string, and the microconverters 100 then switch control for converting the input voltages from the PVs.

The role of the reference string is the same as in Embodiment 1.

Embodiment 3

Figure 20:
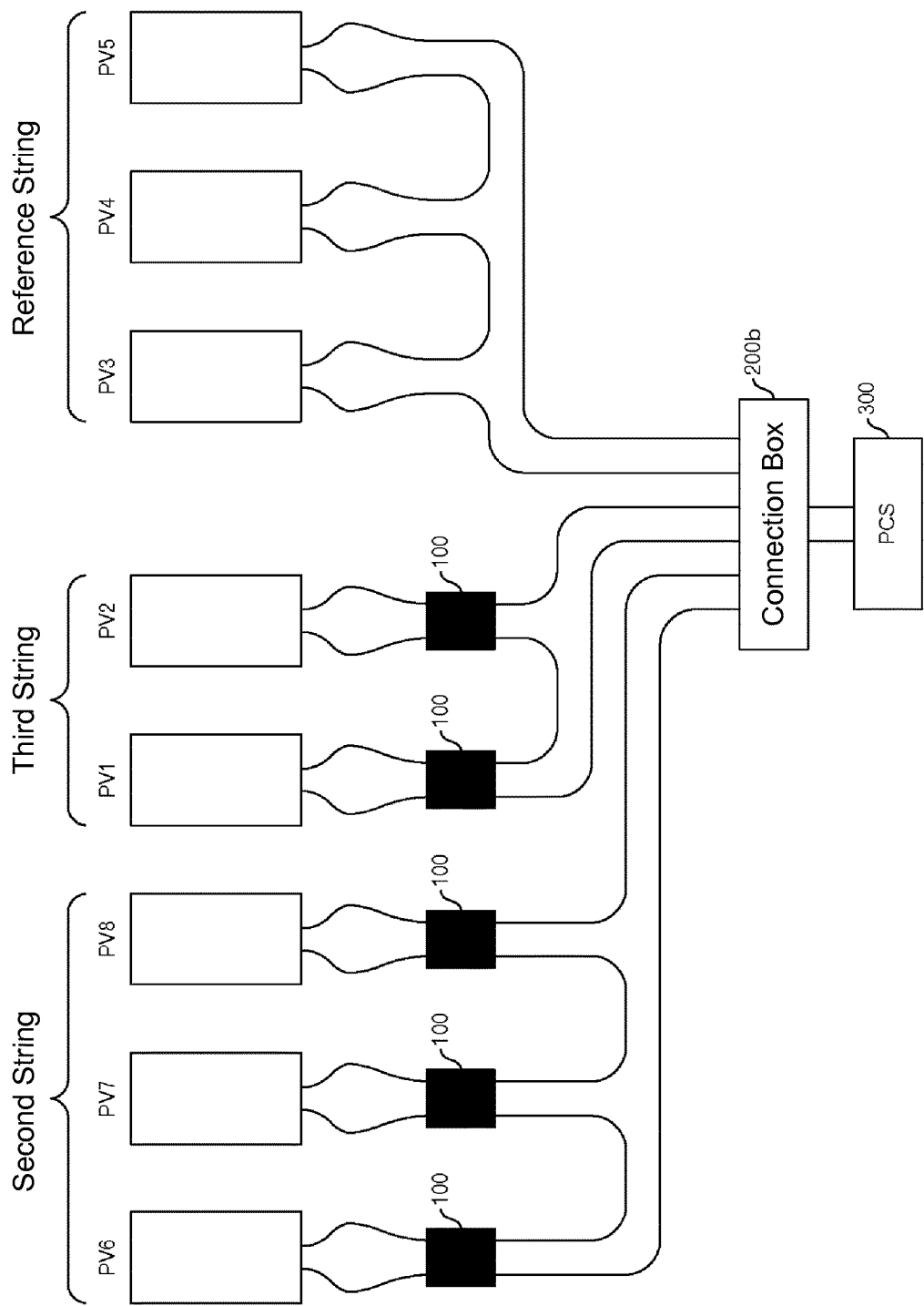
FIG. 20 is a diagram illustrating an overview of a photovoltaic power generating system according to Embodiment 3.

The present embodiment describes a case where three PVs are connected in series in the second string and two PVs are connected in series in a third string, as illustrated in FIG. 20. In the example illustrated in FIG. 20, a PV 6 to a PV 8 are connected in series in the second string. Furthermore, a PV 1 and a PV 2 are connected in series in the third string. Note that the microconverter 100 connected to each PV is the same as the microconverter 100 illustrated in Embodiment 1.

Figure 21:
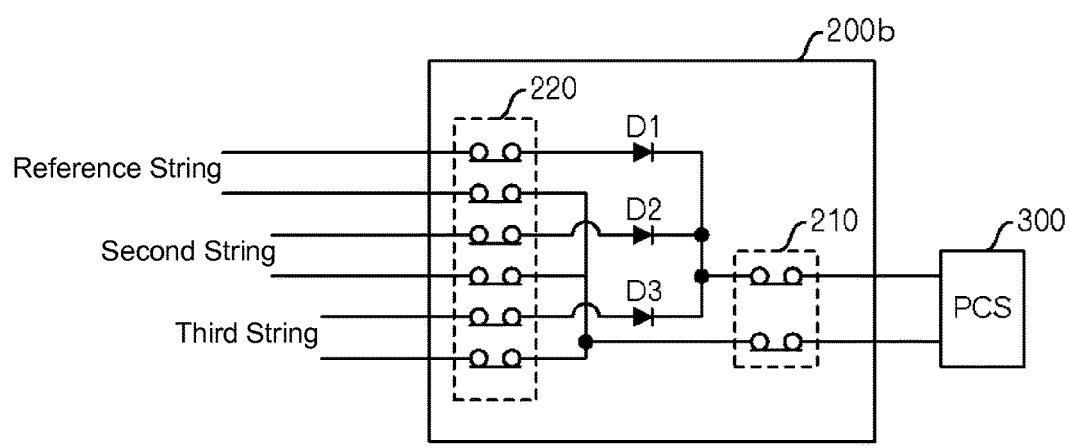
FIG. 21 is a diagram illustrating the configuration of a connection box according to Embodiment 3.

Although the configuration of the connection box is similar to that illustrated in FIG. 3, the number of terminals in the switch 220 has been increased for the third string in addition to the reference string and the second string, and a diode D3 has been added as well, as illustrated in FIG. 21.

Next, an overview of operations of a photovoltaic power generating system according to the present embodiment will be given using FIG. 22 and FIG. 23.

Figure 22:
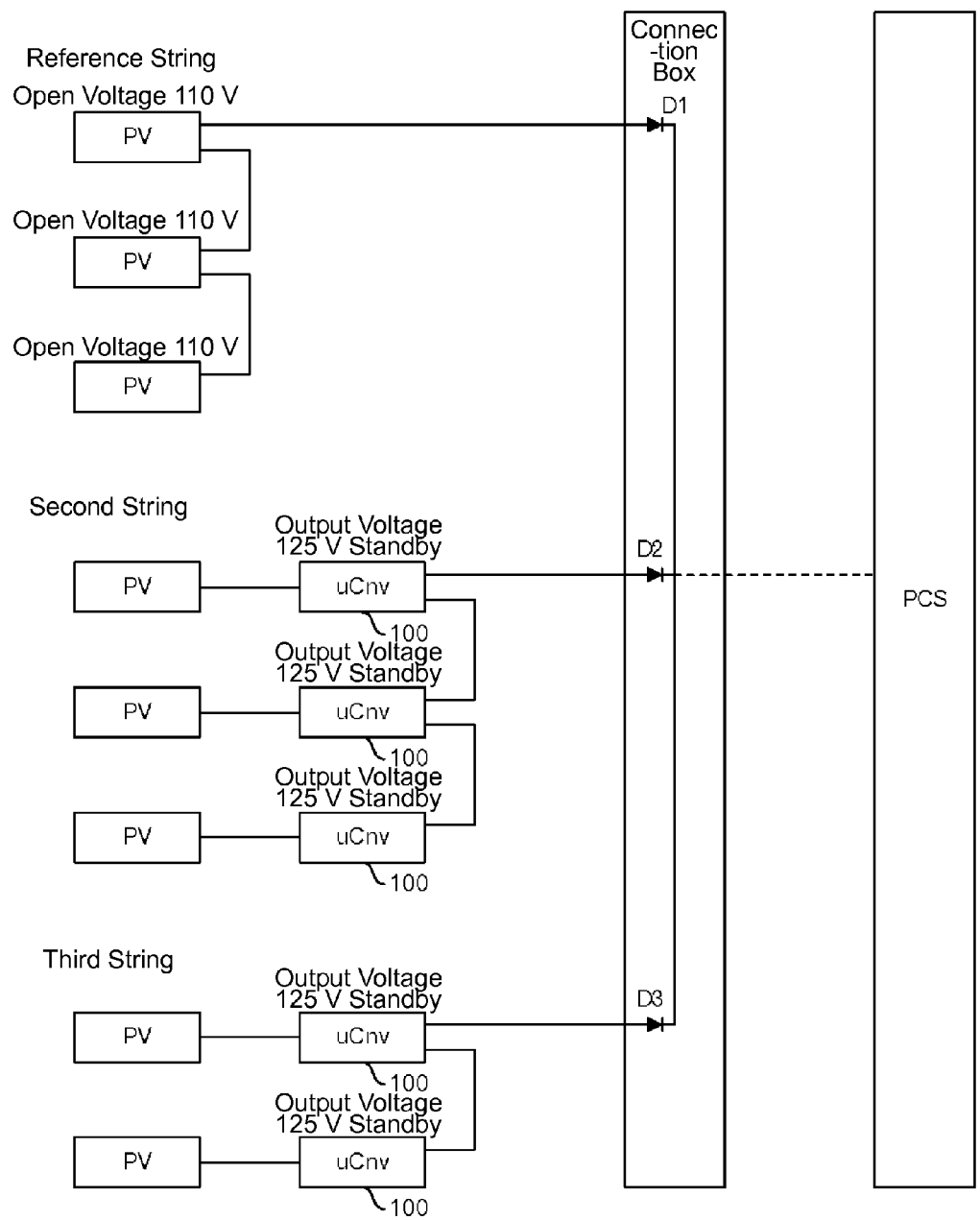
FIG. 22 is a diagram illustrating an overview of operations performed by the photovoltaic power generating system according to Embodiment 3.

In the present embodiment, as illustrated in FIG. 22, a current does not flow to the PCS 300 prior to the PCS 300 being started, and thus even if power generation using the PVs is started, the PCS 300 stands by with the reference string having three open voltages of 110V in series for a total output of 330V (less than 400V), the second string having three output voltages of 125V in series for a total of 375V (greater than a maximum power point voltage of 240V (=80V×3) in the case where there are three PVs in series), and the third string having two output voltages of 125V in series for a total of 250V.

When the PCS 300 is started, a current flows to the PCS 300, but the current initially flows from the second string whose output voltage is higher during standby, and thus the voltage drops toward 240V in the three PVs in series having the maximum power point voltage of 80V. When the output voltage in the second string drops to 330V, a current begins to flow from the reference string, and the input voltage to the PCS 300 drops to 240V. Likewise, when an output voltage in the third string drops to 250V, a current begins to flow from the third string, and the input voltage of the PCS 300 drops to 240V.

When the output voltage of the reference string is 240V, the three microconverters 100 in the second string convert the output voltages of the respective PVs so as to attain a total of 240V, and the two microconverters 100 in the third string also convert the output voltages of the respective PVs so as to attain a total of 240V.

Figure 23:
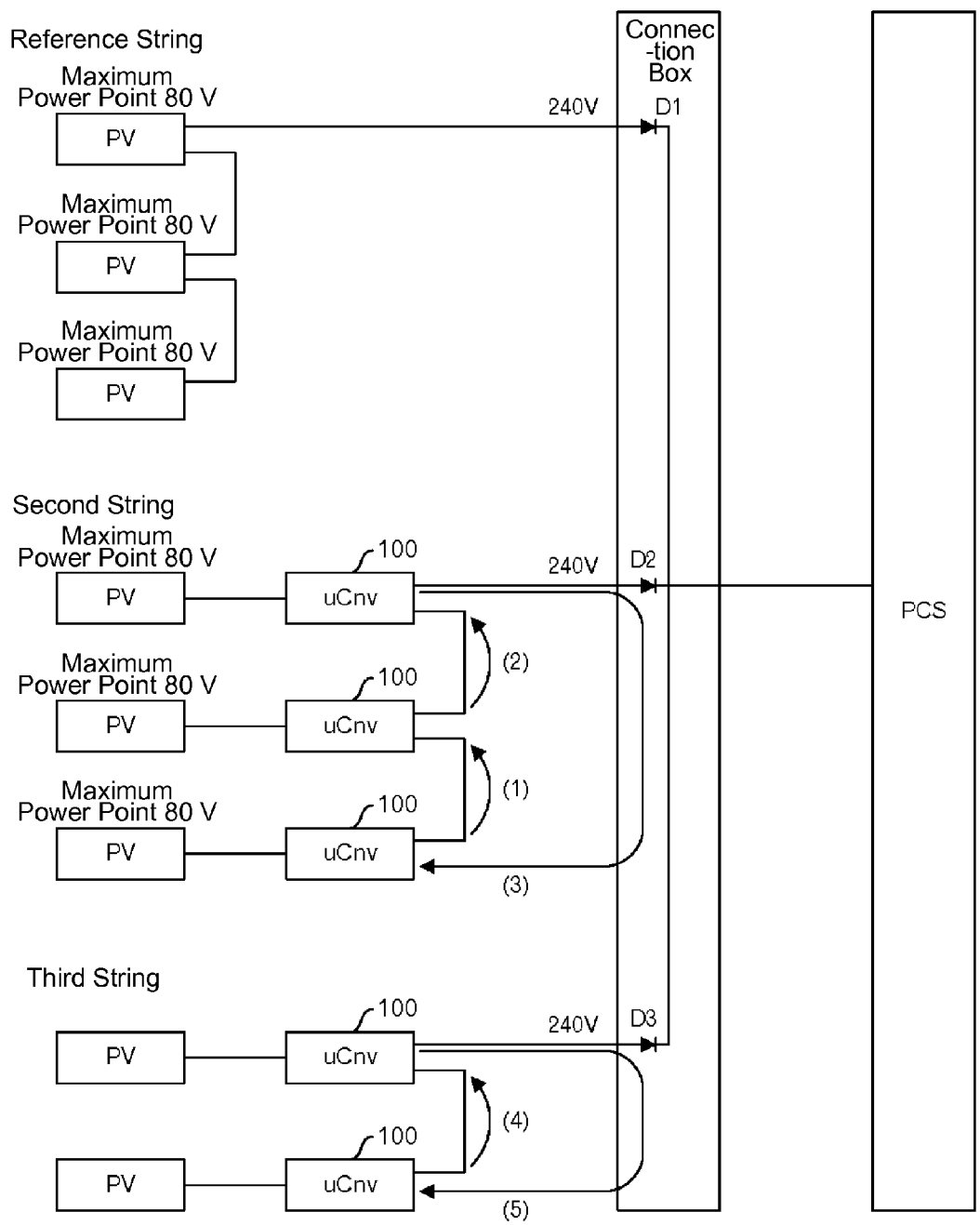
FIG. 23 is a diagram illustrating an overview of operations performed by the photovoltaic power generating system according to Embodiment 3.

Here, when the current begins to flow, the microconverters 100 in the second string exchange signals expressing identifiers of the respective microconverters 100 with each other through power line communication ((1) to (3) in FIG. 23) and automatically recognize that the number of the microconverters 100 connected in series is 3 in the second string, and the microconverters 100 then execute control for converting the input voltages from the PVs. Likewise, when the current begins to flow, the microconverters 100 in the third string exchange signals expressing identifiers of the respective microconverters 100 with each other through power line communication ((4) and (5) in FIG. 23) and automatically recognize that the number of the microconverters 100 connected in series is 2 in the third string, and the microconverters 100 then execute control for converting the input voltages from the PVs.

The role of the reference string is the same as in Embodiment 1.

Although the foregoing has described embodiments of the present invention, the present invention is not intended to be limited thereto. For example, the processing flows may be changed as long as the results of the processing are the same. Furthermore, the microcontroller MCU may be any type of microcontroller having processing capabilities sufficient to realize the functions described above.

In addition, although the foregoing assumes PWM control being carries out, the circuitry may employ another control method instead.

DESCRIPTION OF REFERENCE CHARACTERS

100 microconverter
200 connection box
300 PCS
110 power line communication coupling circuit
120 front-end circuit

What is claimed is:

1. A converter for use in a distributed power system for stepping up or down a voltage of a power source connected thereto, the converter being a local converter directly attached to the power source, the converter comprising:
   a step up/down circuit that directly receives said voltage, steps up or steps down said voltage from the power source, and then outputs said stepped up/down voltage;
   a control circuit directly connected to the step up/down circuit to direct said voltage from the power source and transmits a control signal for stepping up or stepping down said voltage to said step up/down circuit; and
   a frontend circuit that communicates with another converter attached to another power source in the distributed power system when said another power source with said another converter is connected to the distributed power system,
   wherein said control circuit generates an identification signal that identifies said converter and transmits said identification signal through the frontend circuit, and said control circuit is configured to receive an identification signal from said another converter through the frontend circuit without going through a central control system when said another power source with said another converter is connected to the distributed power system so as to detect the presence of said another converter without using the central control system.

2. The converter according to claim 1, wherein said control circuit generates said identification signal by generating a random number or reading out a pre-set identifier from a memory.

3. A photovoltaic power generating system having one or more strings connected in parallel, at least one of said one or more strings having a plurality of local converters that are connected in series at an output side and that are directly connected to a plurality of photovoltaic cells, respectively, at an input side, each local converter stepping up or stepping down a voltage generated by the corresponding one of the plurality of photovoltaic cells directly connected thereto, wherein each of said plurality of local converters has a step up/down circuit that directly receives said voltage from the corresponding photovoltaic cell, steps up or steps down said voltage, and then outputs said stepped up/down voltage; a control circuit directly connected to the step up/down circuit that detects said voltage from the corresponding photovoltaic cell and transmits a control signal for stepping up or stepping down said voltage to said step up/down circuit; and a frontend circuit that communicates with other local converters attached to other photovoltaic cells, and wherein said control circuit generates an identifier that identifies the local converter to which said control circuit belongs, and transmits the identifier to other local converters through the frontend circuit, and receives identifiers generated and transmitted by other local converters without going through a central control system so as to detect the number of the plurality of local converters connected in series in the corresponding string without using the central control system.

4. The photovoltaic power generating system according to claim 3, wherein said control circuit specifies said number of local converters by repeatedly transmitting and receiving said identifiers through the frontend circuit and controls said step up/down circuit in accordance with said detected number of local converters.

5. The photovoltaic power generating system according to claim 3, wherein each local converter further includes a memory that pre-stores prescribed voltages that are respectively set in accordance with the number of local converters in the string, reads out one of the prescribed voltages that corresponds to the detected number of local converters from the memory, and steps up or steps down said voltage from the corresponding photovoltaic cell so that the stepped up/down voltage coincides with the read-out prescribed voltage.

6. The photovoltaic power generating system according to claim 3, wherein said control circuit performs control based on said voltage from the corresponding photovoltaic cell when the detected number of local converters is less than a predetermined number, and carries out control so that an output voltage of said step up/down circuit is maintained close to a prescribed voltage when the detected number of local converters coincides with the predetermined number and a predetermined condition indicating an output voltage of said step up/down circuit is stable is met.

7. The photovoltaic power generating system according to claim 3, wherein said control circuit generates said identifier by generating a random number or reading out a pre-set value from a memory.

* * * * *